United States Patent
Liu et al.

(10) Patent No.: US 11,711,835 B2
(45) Date of Patent: *Jul. 25, 2023

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,119

(22) Filed: May 19, 2022

(65) Prior Publication Data

US 2022/0279519 A1    Sep. 1, 2022

Related U.S. Application Data

(63) Continuation of application No. 16/937,609, filed on Jul. 24, 2020, now Pat. No. 11,375,512, which is a
(Continued)

(30) Foreign Application Priority Data

Jan. 30, 2018  (CN) .......................... 201810089649.3

(51) Int. Cl.
*H04W 52/36* (2009.01)
*H04W 72/53* (2023.01)
(Continued)

(52) U.S. Cl.
CPC ........... *H04W 72/53* (2023.01); *H04L 1/0003* (2013.01); *H04L 5/0082* (2013.01); *H04W 24/08* (2013.01);
(Continued)

(58) Field of Classification Search
None
See application file for complete search history.

(56) References Cited

U.S. PATENT DOCUMENTS 10,680,761 B2 * 6/2020 Yang ................. H04W 72/0446
10,797,823 B2 * 10/2020 Yoshimura ............ H04W 72/04
(Continued)

FOREIGN PATENT DOCUMENTS

CN       101742682 A       6/2010
CN       103053129 A       4/2013
(Continued)

OTHER PUBLICATIONS

ISR in application No. PCT/CN2019/071531 dated Apr. 1, 2019.
(Continued)

*Primary Examiner* — Sithu Ko

(57) ABSTRACT

The present disclosure provides a method and a device in a communication node used for wireless communications. A communication node first receives first information and second information; and then transmits a first radio signal; and monitors a first signaling in a first time window; the first information is used to determine a time length of the first time window, an interval between an end for a transmission of the first radio signal and a start of the first time window is a first time interval, and the second information is used to determine a time length of the first time interval; a bit output by a first bit block through channel coding is used to generate the first radio signal, the first bit block carries a first identity, and a second identity is used for monitoring the first
(Continued)

First radio signal         First signaling signaling. The present disclosure helps improve the performance of random access.

20 Claims, 14 Drawing Sheets

Related U.S. Application Data continuation of application No. PCT/CN2019/071531, filed on Jan. 14, 2019.

(51) Int. Cl.
  *H04L 1/00* (2006.01)
  *H04L 5/00* (2006.01)
  *H04W 24/08* (2009.01)
  *H04W 72/0446* (2023.01)
  *H04W 72/0453* (2023.01)
  *H04W 72/044* (2023.01)
  *H04W 74/08* (2009.01)
  *H04W 92/10* (2009.01)

(52) U.S. Cl.
  CPC ... *H04W 72/0446* (2013.01); *H04W 72/0453* (2013.01); *H04W 72/0466* (2013.01); *H04W 74/0833* (2013.01); *H04W 92/10* (2013.01)

(56) References Cited

U.S. PATENT DOCUMENTS

| | | | |
|---|---|---|---|
| 10,863,536 B2 * | 12/2020 | Liu | H04L 1/00 |
| 10,932,207 B2 * | 2/2021 | Suzuki | H04W 52/22 |
| 10,966,127 B2 * | 3/2021 | Suzuki | H04W 36/0072 |
| 10,979,951 B2 * | 4/2021 | Suzuki | H04W 36/0072 |
| 11,375,546 B2 * | 6/2022 | Suzuki | H04W 74/0808 |
| 2013/0016701 A1 | 1/2013 | Malladi et al. | |

FOREIGN PATENT DOCUMENTS

| | | |
|---|---|---|
| CN | 103053215 A | 4/2013 |
| CN | 107204837 A | 9/2017 |
| CN | 107343297 A | 11/2017 |
| CN | 107404369 Y | 11/2017 |
| CN | 107623649 Y | 1/2018 |

OTHER PUBLICATIONS

CN Search Report in application No. 201810089649.3 dated Feb. 19, 2020.
CN First Office Action in application No. 201810089649.3 Feb. 27, 2020.
«3GPP TR 38.811» study on New Radio (NR) to support Non Terrestrial Networks.

* cited by examiner

METHOD AND DEVICE IN COMMUNICATION NODE USED FOR WIRELESS COMMUNICATION

CROSS REFERENCE TO RELATED APPLICATIONS

This application is a continuation of the U.S. patent application Ser. No. 16/937,609, filed on Jul. 24, 2020, which is a continuation of International Application No. PCT/CN2019/071531, filed Jan. 14, 2019, claims the priority benefit of Chinese Patent Application No. 201810089649.3, filed on Jan. 30, 2018, the full disclosure of which is incorporated herein by reference.

BACKGROUND

Technical Field

The present disclosure relates to transmission methods and devices in wireless communication systems, and in particular to a transmission scheme and device in non-terrestrial wireless communications.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72th plenary meeting that a study on New Radio (NR), or what is called Fifth Generation (5G) shall be conducted. The work item of NR was approved at the 3GPP RAN #75th plenary meeting to standardize NR.

To ensure better adaptability to various application scenarios and requirements, the 3GPP RAN #75th plenary meeting also approved a study item of NR-backed Non-Terrestrial Networks (NTN) starting with R 15 version and started a WI to standardize relevant techniques in R16. Propagation delays in NTN are much longer than in terrestrial networks.

SUMMARY

In a network with large propagation delay, such as NTN, an increase in Round Trip Time (RTT) will make the existing designs in a random-access process unsatisfactory or even unworkable. In order to meet the requirements of random-access in a network with large propagation delay, the present disclosure proposes a solution. It should be noted that the embodiments of a base station in the present disclosure and characteristics in the embodiments may be applied to a User Equipment (UE) if there is no conflict, and vice versa. And the embodiments of the present disclosure and the characteristics in the embodiments may be mutually combined if no conflict is incurred.

The present disclosure provides a method in a first-type communication node for wireless communications, comprising:
receiving first information and second information;
transmitting a first radio signal;
and monitoring a first signaling in a first time window;
herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

In one embodiment, through joint configuration of the first information and the second information, an adjustment may be made to a position of the first time window according to characteristics of delay in large-delay networks, so that an erroneous determination by the UE on the detection of Msg-4 (including contention resolution) in random access due to large delay can be avoided, thereby preventing random-access failure.

In one embodiment, the above method in the present disclosure helps prevent access failure in both contention-based random access and non-contention-based random access caused by large propagation delay.

According to one aspect of the present disclosure, the above method is characterized in further comprising:
receiving a second radio signal;
herein, the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

According to one aspect of the present disclosure, the above method is characterized in further comprising:
transmitting a third radio signal; and
monitoring a second signaling in a second time window;
herein, a time interval between an end of a transmission of the third radio signal and a start of the second time window is a second time interval, and a time length of the second time interval is related to a time length of the first time interval; a third identity is used for monitoring the second signaling, and a radio resource occupied by the third radio signal is used to determine the third identity; the third radio signal and the second signaling are transmitted via the air interface.

According to one aspect of the present disclosure, the above method is characterized in further comprising:
receiving a fourth radio signal;
herein, the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval; the fourth radio signal is transmitted via the air interface.

According to one aspect of the present disclosure, the above method is characterized in that the third bit block also carries third information, the third information is used to indicate time-frequency resources occupied by the first radio signal and a modulation and coding scheme employed by the first radio signal, and the third identity is used to generate a scrambling code for a bit output by the third bit block through channel coding.

According to one aspect of the present disclosure, the above method is characterized in further comprising:

receiving a third signaling;

herein, the third signaling is used to indicate time-frequency resources occupied, a redundancy version (RV) applied and a modulation and coding scheme employed by the first radio signal.

The present disclosure provides a method in a second-type communication node for wireless communications, comprising:

transmitting first information and second information;
receiving a first radio signal; and
transmitting a first signaling in a first time window;

herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

According to one aspect of the present disclosure, the above method is characterized in further comprising:

transmitting a second radio signal;

herein, the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

According to one aspect of the present disclosure, the above method is characterized in further comprising:

receiving a third radio signal; and
transmitting a second signaling in a second time window;

herein, a time interval between an end of a transmission of the third radio signal and a start of the second time window is a second time interval, and a time length of the second time interval is related to a time length of the first time interval; a third identity is used for monitoring the second signaling, and a radio resource occupied by the third radio signal is used to determine the third identity; the third radio signal and the second signaling are transmitted via the air interface.

According to one aspect of the present disclosure, the above method is characterized in further comprising:

transmitting a fourth radio signal;

herein, the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval; the fourth radio signal is transmitted via the air interface.

According to one aspect of the present disclosure, the above method is characterized in that the third bit block also carries third information, the third information is used to indicate time-frequency resources occupied by the first radio signal and a modulation and coding scheme employed by the first radio signal, and the third identity is used to generate a scrambling code for a bit output by the third bit block through channel coding.

According to one aspect of the present disclosure, the above method is characterized in further comprising:

transmitting a third signaling;

herein, the third signaling is used to indicate time-frequency resources occupied, a redundancy version (RV) applied and a modulation and coding scheme employed by the first radio signal.

The present disclosure provides a first-type communication node for wireless communications, comprising:

a first receiver, receiving first information and second information;
a first transceiver, transmitting a first radio signal; and
a second receiver, monitoring a first signaling in a first time window;

herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

According to one aspect of the present disclosure, the first-type communication node is characterized in that the first transceiver also receives a second radio signal; herein, the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

According to one aspect of the present disclosure, the first-type communication node is characterized in that the first transceiver also transmits a third radio signal; and the second receiver monitors a second signaling in a second time window; wherein a time interval between an end of a transmission of the third radio signal and a start of the second time window is a second time interval, and a time length of the second time interval is related to a time length of the first time interval; a third identity is used for monitoring the second signaling, and a radio resource occupied by the third radio signal is used to determine the third identity; the third radio signal and the second signaling are transmitted via the air interface.

According to one aspect of the present disclosure, the first-type communication node is characterized in that the first transceiver also receives a fourth radio signal; herein, the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval; the fourth radio signal is transmitted via the air interface.

According to one aspect of the present disclosure, the first-type communication node is characterized in that the third bit block also carries third information, the third information is used to indicate time-frequency resources occupied by the first radio signal and a modulation and coding scheme employed by the first radio signal, and the third identity is used to generate a scrambling code for a bit output by the third bit block through channel coding.

According to one aspect of the present disclosure, the first-type communication node is characterized in that the second receiver also receives a third signaling; herein, the third signaling is used to indicate time-frequency resources occupied, a redundancy version (RV) applied and a modulation and coding scheme employed by the first radio signal.

The present disclosure provides a second-type communication node for wireless communications, comprising:

a first transmitter, transmitting first information and second information;

a second transceiver, receiving a first radio signal; and a second transmitter, transmitting a first signaling in a first time window;

herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

According to one aspect of the present disclosure, the second-type communication node is characterized in that the second transceiver also transmits a second radio signal; herein, the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

According to one aspect of the present disclosure, the second-type communication node is characterized in that the second transceiver also receives a third radio signal; and the second transmitter also transmits a second signaling in a second time window; wherein a time interval between an end of a transmission of the third radio signal and a start of the second time window is a second time interval, and a time length of the second time interval is related to a time length of the first time interval; a third identity is used for monitoring the second signaling, and a radio resource occupied by the third radio signal is used to determine the third identity; the third radio signal and the second signaling are transmitted via the air interface.

According to one aspect of the present disclosure, the second-type communication node is characterized in that the second transceiver also transmits a fourth radio signal; herein, the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval; the fourth radio signal is transmitted via the air interface.

According to one aspect of the present disclosure, the second-type communication node is characterized in that the third bit block also carries third information, the third information is used to indicate time-frequency resources occupied by the first radio signal and a modulation and coding scheme employed by the first radio signal, and the third identity is used to generate a scrambling code for a bit output by the third bit block through channel coding.

According to one aspect of the present disclosure, the second-type communication node is characterized in that the second transmitter also transmits a third signaling; herein, the third signaling is used to indicate time-frequency resources occupied, a redundancy version (RV) applied and a modulation and coding scheme employed by the first radio signal.

In one embodiment, compared with the current random-access process for Terrestrial Networks, the present disclosure is featured with major technical edges as follows:

The present disclosure provides a method by which a UE can flexibly adjust a monitoring time window of a Msg-4 in accordance with delay, thus preventing the UE from making an erroneous determination on the detection of Msg-4 (including contention resolution) in random access due to large delay, and avoiding random-access failure.

The present disclosure provides a method by which a UE can flexibly adjust uplink timing and a detection time window of a Msg-2 in accordance with delay, thereby ensuring the correct receiving of the Msg-2 as well as accurate timing for subsequent uplink transmission and finally improving the link and system's performance.

The method in the present disclosure can help avoid access failure in contention-based random access and non-contention-based random access due to large propagation delay.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
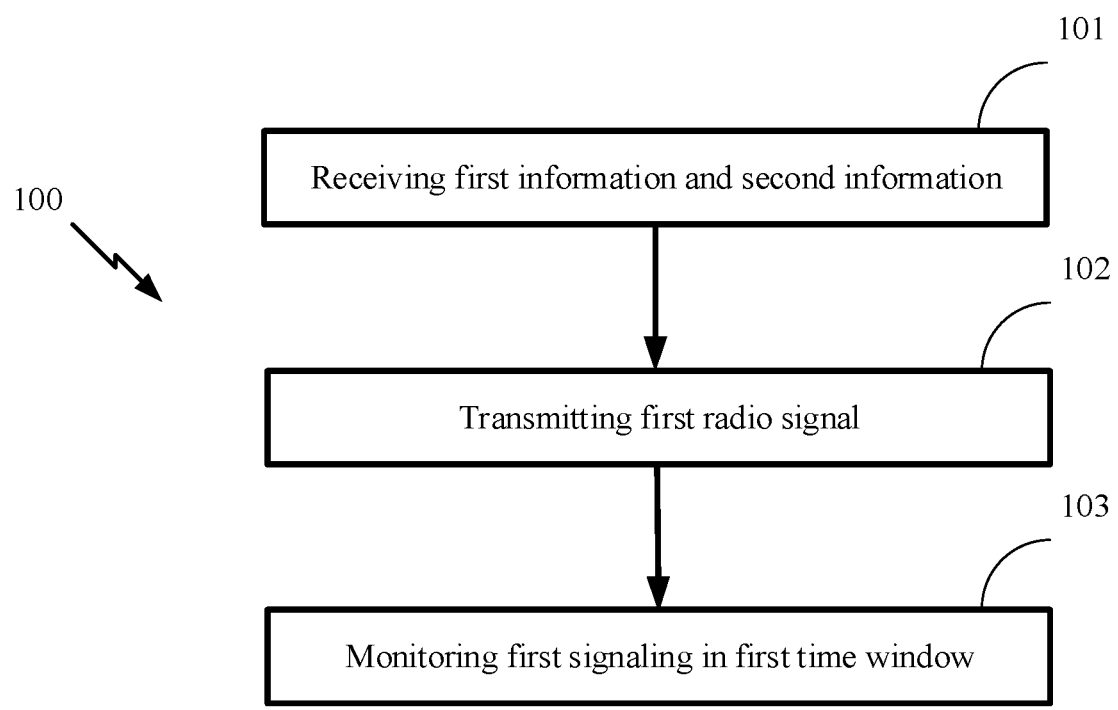
FIG. 1 illustrates a flowchart of transmission of first information, second information, a first radio signal and a first signaling according to one embodiment of the present disclosure.

Embodiment 1 illustrates a flowchart of transmission of first information, second information, a first radio signal and a first signaling according to one embodiment of the present disclosure, as shown in FIG. 1. In FIG. 1, each box represents a step. In Embodiment 1, the first-type communication node of the present disclosure first receives first information and second information; and then transmits a first radio signal; and monitors a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

In one embodiment, the first identity is the same as the second identity, the latter being used to generate a scrambling code for the bit output by the first bit block through channel coding.

In one embodiment, the first identity is the same as the second identity, a Temporary Cell Radio Network Temporary Identifier (TC-RNTI) received by the first-type communication node is used to generate a scrambling code for the bit output by the first bit block through channel coding.

In one embodiment, the first information and the second information are transmitted through a same physical channel.

In one embodiment, the first information and the second information are transmitted through different physical channels.

In one embodiment, the first information and the second information are two different fields in a same signaling.

In one embodiment, the first information and the second information are two different Information Element(s) in a same Radio Resource Control (RRC) signaling.

In one embodiment, the first information and the second information are transmitted through different signalings.

In one embodiment, the first information is transmitted through a higher-layer signaling.

In one embodiment, the first information is transmitted through a physical-layer signaling.

In one embodiment, the first information comprises all or part of a higher-layer signaling.

In one embodiment, the first information comprises all or part of a physical-layer signaling.

In one embodiment, the first information is transmitted through a Physical Broadcast Channel (PBCH).

In one embodiment, the first information comprises one or more fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more fields in a System Information Block (SIB).

In one embodiment, the first information comprises one or more fields in Remaining System Information (RMSI).

In one embodiment, the first information comprises all or part of an RRC signaling.

In one embodiment, the first information is broadcast.

In one embodiment, the first information is unicast.

In one embodiment, the first information is cell specific.

In one embodiment, the first information is UE-specific.

In one embodiment, the first information is transmitted through a Physical Downlink Control Channel (PDCCH).

In one embodiment, the first information comprises all or part of fields in a piece of Downlink Control Information (DCI).

In one embodiment, the phrase that the first information is used to determine a time length of the first time window means that the first information is used for directly indicating the time length of the first time window.

In one embodiment, the phrase that the first information is used to determine a time length of the first time window means that the first information is used for indirectly indicating the time length of the first time window.

In one embodiment, the phrase that the first information is used to determine a time length of the first time window means that the first information is used for explicitly indicating the time length of the first time window.

In one embodiment, the phrase that the first information is used to determine a time length of the first time window means that the first information is used for implicitly indicating the time length of the first time window.

In one embodiment, the phrase that the first information is used to determine a time length of the first time window means that the first information is used by the first-type communication node for determining the time length of the first time window.

In one embodiment, the second information is transmitted through a higher-layer signaling.

In one embodiment, the second information is transmitted through a physical-layer signaling.

In one embodiment, the second information comprises all or part of a higher-layer signaling.

In one embodiment, the second information comprises all or part of a physical-layer signaling.

In one embodiment, the second information is transmitted through a PBCH.

In one embodiment, the second information comprises one or more fields in a MIB.

In one embodiment, the second information is transmitted through a DL-SCH.

In one embodiment, the second information is transmitted through a PDSCH.

In one embodiment, the second information comprises one or more fields in a SIB.

In one embodiment, the second information comprises one or more fields in RMSI.

In one embodiment, the second information comprises all or part of an RRC signaling.

In one embodiment, the second information is broadcast.

In one embodiment, the second information is unicast.

In one embodiment, the second information is cell specific.

In one embodiment, the second information is UE-specific.

In one embodiment, the second information is transmitted through a PDCCH.

In one embodiment, the second information comprises all or part of fields in a piece of DCI.

In one embodiment, the phrase that the second information is used to determine a time length of the first time interval means that the second information is used by the first-type communication node for determining the time length of the first time interval.

In one embodiment, the phrase that the second information is used to determine a time length of the first time interval means that the second information is used for directly indicating the time length of the first time interval.

In one embodiment, the phrase that the second information is used to determine a time length of the first time interval means that the second information is used for indirectly indicating the time length of the first time interval.

In one embodiment, the phrase that the second information is used to determine a time length of the first time interval means that the second information is used for explicitly indicating the time length of the first time interval.

In one embodiment, the phrase that the second information is used to determine a time length of the first time interval means that the second information is used for implicitly indicating the time length of the first time interval.

In one embodiment, the phrase that the second information is used to determine a time length of the first time interval means that the second information is used to indicate whether the time length of the first time interval is equal to 0.

In one embodiment, the phrase that the second information is used to determine a time length of the first time interval means that the second information is used to indicate the time length of the first time interval out of R candidate time lengths, R being a positive integer greater than 1.

In one embodiment, the phrase that the second information is used to determine a time length of the first time interval means that the second information is used to indicate a target time length, the time length of the first time interval is a sum of the target time length and a target offset length, and the target offset length is a pre-defined or configurable time length.

In one embodiment, the phrase that the second information is used to determine a time length of the first time interval means that the second information is used to indicate the height of a transmitter of the second information, and the height of the transmitter of the second information is used to determine the time length of the first time interval.

In one embodiment, the phrase that the second information is used to determine a time length of the first time interval means that the second information is used to indicate a reference Round Trip Time (RTT) delay of a transmitter of the second information upon arrival at the first-type communication node, the reference RTT delay is used to determine the time length of the first time interval.

In one embodiment, the phrase that the second information is used to determine a time length of the first time interval means that the second information is used to indicate the height of a transmitter of the second information, and the time length of the first time interval is positively linear with the height of the transmitter of the second information.

In one embodiment, the phrase that the second information is used to determine a time length of the first time interval means that the second information is used to indicate a reference Round Trip Time (RTT) delay of a transmitter of the second information upon arrival at the first-type communication node, the time length of the first time interval is positively linear with the reference RTT delay.

In one embodiment, the first radio signal carries a Msg-3.

In one embodiment, the first radio signal is used for random-access process.

In one embodiment, the first radio signal carries a retransmission of a Msg-3.

In one embodiment, the first radio signal carries an initial transmission of a Msg-3.

In one embodiment, the first radio signal is transmitted through an Uplink Shared Channel (UL-SCH).

In one embodiment, the first radio signal is transmitted through a Physical Uplink Shared Channel (PUSCH).

In one embodiment, a bit output by the first bit block through Low Density Parity Check Code (LDPC) channel coding is used to generate the first radio signal.

In one embodiment, a bit output by the first bit block through Polar channel coding is used to generate the first radio signal.

In one embodiment, a bit output by the first bit block through Turbo channel coding is used to generate the first radio signal.

In one embodiment, a bit output by the first bit block through Convolutional channel coding is used to generate the first radio signal.

In one embodiment, a bit output by the first bit block through Low Density Parity Check Code (LDPC) channel coding in 3GPP TS38.212, section 5.3.2 is used to generate the first radio signal.

In one embodiment, the first radio signal is obtained after the bit output by the first bit block through channel coding sequentially goes through Rate Matching, Concatenation, Scrambling, a Modulation Mapper, a Layer Mapper, Precoding, a Resource Element Mapper, and Baseband Signal Generation, as well as Modulation and Upconversion.

In one embodiment, a target bit block is obtained after the bit output by the first bit block through channel coding sequentially goes through Rate Matching and Concatenation with other bits, and the first radio signal is obtained after the target bit block is sequentially through Scrambling, a Modulation Mapper, a Layer Mapper, Precoding, a Resource Element Mapper and Baseband Signal Generation, as well as Modulation and Upconversion.

In one embodiment, the channel coding is LDPC coding in 3GPP TS38.212(v2.0.0), section 5.3.2.

In one embodiment, the channel coding is polar coding in 3GPP TS38.212(v2.0.0), section 5.3.1.

In one embodiment, the channel coding is Turbo coding in 3GPP TS36.212, section 5.1.3.2.

In one embodiment, the channel coding is Convolutional coding in 3GPP TS36.212, section 5.1.3.1.

In one embodiment, the first bit block is transferred from a higher layer to a physical layer.

In one embodiment, the first bit block is all or part of a Transport Block (TB).

In one embodiment, the first bit block is obtained by a TB through Cyclic Redundancy Check (CRC) insertion.

In one embodiment, the first bit block is obtained by a TB through transport block CRC insertion, segmentation and code block CRC insertion in sequence.

In one embodiment, the first bit block is all or part of a Code Block Group (CBG).

In one embodiment, the first bit block is all or part of a Code Block (CB).

In one embodiment, the first bit block carries a retransmission of a Msg-3.

In one embodiment, the first bit block carries an initial transmission of a Msg-3.

In one embodiment, the first time window comprises a positive integer number of contiguous subframes.

In one embodiment, the first time window comprises a positive integer number of contiguous slots.

In one embodiment, the first time window comprises a positive integer number of contiguous OFDM symbols.

In one embodiment, a time length of the first time window is measured by ms.

In one embodiment, a time length of the first time window is measured by a number of slots.

In one embodiment, a time length of the first time window is a time length identified by IE "ra-ContentionResolutionTimer" in 3GPP TS36.331.

In one embodiment, a time length of the first time window is a time length identified by IE "ra-ContentionResolutionTimer" in 3GPP TS38.331.

In one embodiment, the first-type communication node performs blind detection on the first signaling in the first time window.

In one embodiment, the first-type communication node performs blind detection on the first signaling based on a Radio Network Temporary Identity (RNTI) in the first time window.

In one embodiment, the first-type communication node monitors the first signaling by performing blind detection on an RNTI scrambled by CRC of the first signaling in the first time window.

In one embodiment, the first signaling is a physical-layer signaling.

In one embodiment, the first signaling is transmitted through a PDCCH.

In one embodiment, the first signaling comprises all or part of fields in a piece of DCI.

In one embodiment, the first signaling is detected in a Common Search Space (CSS).

In one embodiment, the first signaling is detected in a UE-specific Search Space (USS).

In one embodiment, the time length of the first time interval is greater than 0 ms.

In one embodiment, the time length of the first time interval is equal to 0 ms.

In one embodiment, an end of a transmission of the first radio signal is no later than a start of the first time window.

In one embodiment, an end of a transmission of the first radio signal is earlier than a start of the first time window.

In one embodiment, both the first identity and the second identity are non-negative integers.

In one embodiment, the first identity is a Cell Radio Network Temporary Identifier (C-RNTI) allocated to the first-type communication node.

In one embodiment, the first identity is a UE Contention Resolution Identity of the first-type communication node.

In one embodiment, the first identity is a non-negative integer represented by 48 bits.

In one embodiment, the first identity is a non-negative integral random number selected by the first-type communication node at random.

In one embodiment, the second identity is a C-RNTI allocated to the first-type communication node.

In one embodiment, the second identity is a Temporary Cell Radio Network Temporary Identifier (TC-RNTI).

In one embodiment, the second identity is a TC-RNTI received by the first-type communication node.

In one embodiment, the phrase that the second identity is used for monitoring of the first signaling means that the second identity is used for blind detection of the first signaling.

In one embodiment, the phrase that the second identity is used for monitoring of the first signaling means that the second identity is used for scrambling CRC of a PDCCH carrying the first signaling.

In one embodiment, the phrase that the second identity is used for monitoring of the first signaling means that the second identity is used for a Mask of CRC of a PDCCH carrying the first signaling.

In one embodiment, the phrase that the second identity is used for monitoring of the first signaling means that the first-type communication node determines whether the first signaling is detected according to whether CRC of a PDCCH carrying the first signaling is passed, and the second identity is used for scrambling CRC of the PDCCH carrying the first signaling.

In one embodiment, the phrase that the second identity is used to generate a scrambling code for the bit output by the first bit block through channel coding means that the second identity is used to initialize a scrambling code of the bit output by the first bit block through channel coding.

In one embodiment, the phrase that the second identity is used to generate a scrambling code for the bit output by the first bit block through channel coding means that the second identity is used to initialize a generation register for a scrambling code of the bit output by the first bit block through channel coding.

In one embodiment, the process that the second identity is used to generate a scrambling code for the bit output by the first bit block through channel coding is completed through the following formula:

$$c_{init}=n_{RNTI} \cdot 2^{15}+n_{ID}$$

Herein, the $n_{RNTI}$ identifies the second identity, the $n_{ID} \in \{0, 1, \ldots, 1023\}$ is configured by a higher-layer signaling or is equal to a physical celling ID, and the $c_{init}$ is used to initialize a generation register for a scrambling code of the bit output by the first bit block through channel coding, which the second identity is used to generate.

In one embodiment, the air interface is wireless.

In one embodiment, the air interface comprises a wireless channel.

In one embodiment, the air interface is an interface between the second-type communication node and the first-type communication node.

In one embodiment, the air interface is a Uu interface.

Embodiment 2

Figure 2:
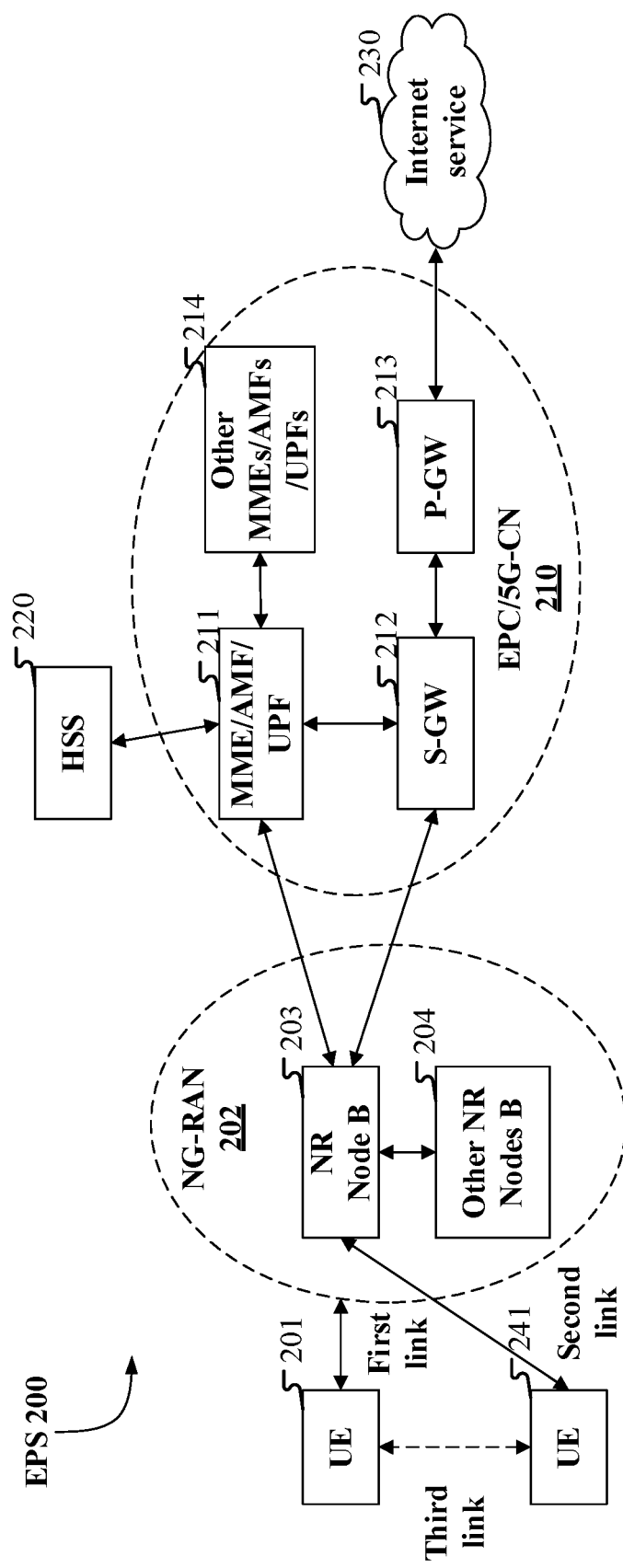
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200, which may comprise one or more UEs 201, an NG-RAN 202, a Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 may be a satellite, an aircraft, or a terrestrial base station relayed by satellites. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first-type communication node in the present disclosure.

In one embodiment, the UE 201 supports transmissions within NTN.

In one embodiment, the gNB 203 corresponds to the second-type communication node in the present disclosure.

In one embodiment, the gNB 203 supports transmission within NTN.

Embodiment 3

Figure 3:
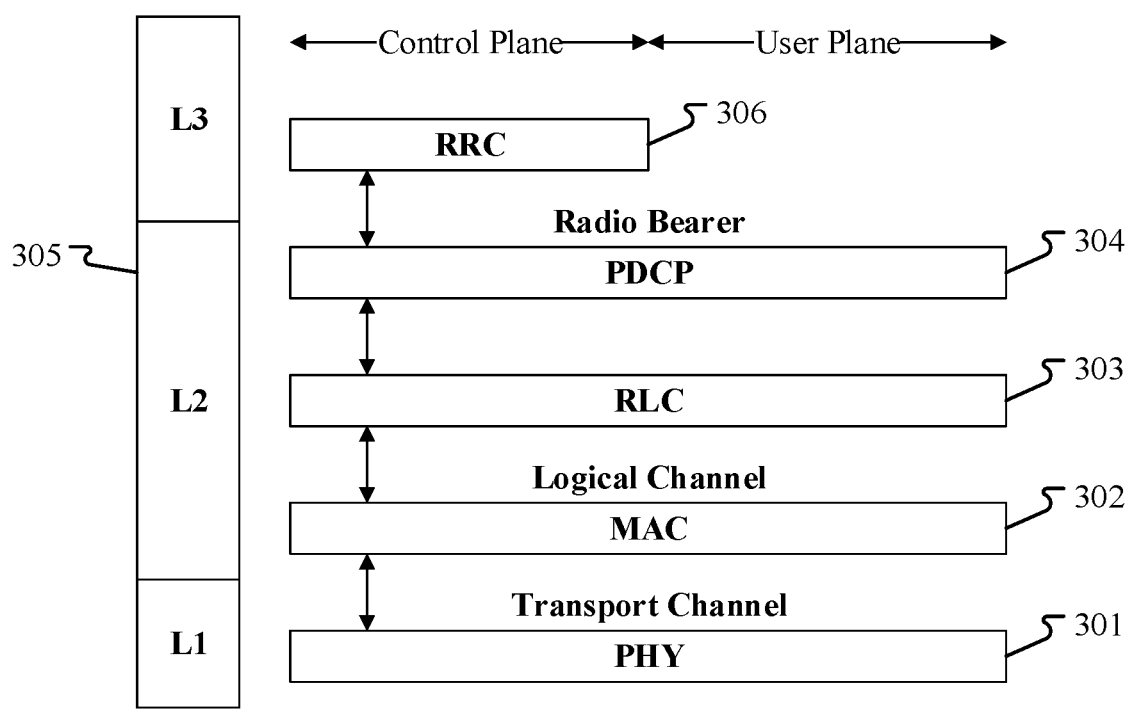
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating a radio protocol architecture of a user plane and a control plane. In FIG. 3, the radio protocol architecture for a first-type communication node (UE) and a second-type communication node (gNB, eNB, or a satellite or aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication nodes of the network side. Although not described in FIG. 3, the first-type communication node may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for handover of first-type communication node between second-type communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first-type communication nodes various radio resources (i.e., resource blocks) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information of the present disclosure is generated by the RRC 306.

In one embodiment, the second information of the present disclosure is generated by the RRC 306.

In one embodiment, the first radio signal of the present disclosure is generated by the RRC 306.

In one embodiment, the first radio signal of the present disclosure is generated by the MAC 302.

In one embodiment, the first radio signal of the present disclosure is generated by the PHY 301.

In one embodiment, the first signaling of the present disclosure is generated by the RRC 306.

In one embodiment, the first signaling of the present disclosure is generated by the MAC 302.

In one embodiment, the first signaling of the present disclosure is generated by the PHY 301.

In one embodiment, the second radio signal of the present disclosure is generated by the RRC 306.

In one embodiment, the second radio signal of the present disclosure is generated by the MAC 302.

In one embodiment, the second radio signal of the present disclosure is generated by the PHY 301.

In one embodiment, the third radio signal of the present disclosure is generated by the RRC 306.

In one embodiment, the third radio signal of the present disclosure is generated by the MAC 302.

In one embodiment, the third radio signal of the present disclosure is generated by the PHY 301.

In one embodiment, the second signaling of the present disclosure is generated by the RRC 306.

In one embodiment, the second signaling of the present disclosure is generated by the MAC 302.

In one embodiment, the second signaling of the present disclosure is generated by the PHY 301.

In one embodiment, the fourth radio signal of the present disclosure is generated by the RRC 306.

In one embodiment, the fourth radio signal of the present disclosure is generated by the MAC 302.

In one embodiment, the fourth radio signal of the present disclosure is generated by the PHY 301.

In one embodiment, the third signaling of the present disclosure is generated by the RRC 306.

In one embodiment, the third signaling of the present disclosure is generated by the MAC 302.

In one embodiment, the third signaling of the present disclosure is generated by the PHY 301.

Embodiment 4

Figure 4:
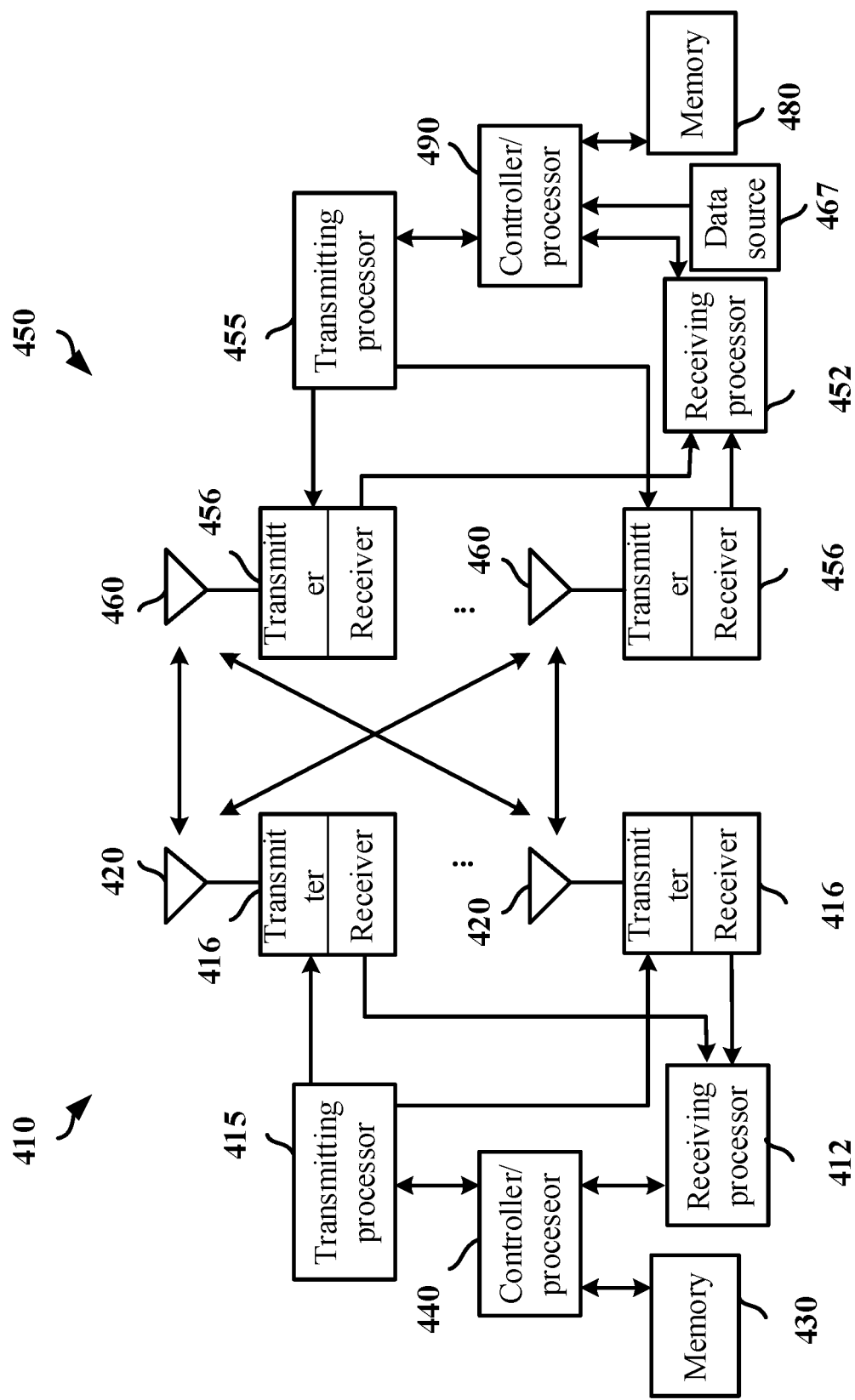
FIG. 4 illustrates a schematic diagram of a first-type communication node and a second-type communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering as well as multiplexing and demultiplexing between a logical channel and a transport channel so as to implement the L2 layer protocols used for the user plane and the control plane. The higher layer packet may comprise data or control information, such as DL-SCH or UL-SCH. The transmitting processor 455 performs various signal transmitting processing functions of the L1 layer (that is, PHY), including coding, interleaving, scrambling, modulation, power control/allocation, precoding and physical layer control signaling generation. The receiving processor 452 performs various signal receiving processing functions of the L1 layer (that is, PHY), including decoding, de-interleaving, descrambling, demodulation, de-precoding and physical layer control signaling extraction. The transmitter 456 is configured to convert a baseband signal provided by the transmitting processor 455 into a radio frequency (RF) signal to be transmitted via the antenna 460. The receiver 456 is configured to convert the RF signal received via the antenna 460 into a baseband signal to be provided to the receiving processor 452.

The base station (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440. The controller/processor 440 provides header compression and decompression, encryption and decryption, packet segmentation and reordering as well as multiplexing and demultiplexing between a logical channel and a transport channel, so as to implement the L2 layer protocols used for the user plane and the control plane. The higher layer packet may comprise data or control information, such as DL-SCH or UL-SCH. The transmitting processor 415 performs various signal transmitting processing functions of the L1 layer (that is, PHY), including coding, interleaving, scrambling, modulation, power control/allocation, precoding and physical layer signaling (i.e., synchronization signal, reference signal, etc.) generation. The receiving processor 412 performs various signal receiving processing functions of the L1 layer (that is, PHY), including decoding, de-interleaving, descrambling, demodulation, de-precoding and physical layer signaling extraction. The transmitter 416 is configured to convert a baseband signal provided by the transmitting processor 415 into a RF signal to be transmitted via the antenna 420. The receiver 416 is configured to convert the RF signal received via the antenna 420 into a baseband signal to be provided to the receiving processor 412.

In Downlink (DL) transmission, a higher layer packet, as carried by first information, second information, a second radio signal and a fourth radio signal of the present disclosure, is provided to the controller/processor 440. The controller/processor 440 implements the functionality of the L2 layer. In DL transmission, the controller/processor 440 provides header compression, encryption, packet segmentation and reordering and multiplexing between a logical channel and a transport channel, as well as radio resource allocation for the UE 450 based on varied priorities. The controller/processor 440 is also in charge of HARQ operation, retransmission of a lost packet, and a signaling to the UE 450, for instance, the first information, the second information, the first signaling, the second signaling and the third signaling of the present disclosure are all generated in the controller/processor 440. The transmitting processor 415 performs signal processing functions of the L1 layer (that is, PHY), including decoding and interleaving, so as to promote Forward Error Correction (FEC) at the UE 450 side and modulation of baseband signal based on various modulation schemes (i.e., BPSK, QPSK). Modulation symbols are divided into parallel streams and each stream is mapped onto a corresponding multicarrier subcarrier and/or multicarrier symbol, which is later mapped from the transmitting processor 415 to the antenna 420 via the transmitter 416 to be transmitted in the form of RF signal. Corresponding channels of the first information, the first signaling, the second signaling and the third signaling, the second radio signal and the fourth radio signal of the present disclosure on the physical layer are mapped from the transmitting processor 415 to a target radio resource and then mapped from the transmitter 416 to the antenna 420 to be transmitted in the form of RF signals. At the receiver side, each receiver 456 receives an RF signal via a corresponding antenna 460; each receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first information, the first signaling, the second signaling and the third signaling, the second radio signal and the fourth radio signal of the present disclosure, demodulation of multicarrier symbols in multicarrier symbol streams based on each modulation scheme (e.g., BPSK, QPSK), and then decoding and de-interleaving of the demodulated symbols so as to recover data or control signals transmitted by the base station (gNB) 410 on a physical channel, and the data or control signals are later provided to the controller/processor 490. The controller/processor 490 implements the functionality of the L2 layer, and interprets the first information, the second information, the second radio signal and the fourth radio signal of the present disclosure. The controller/processor 490 may be associated with the memory 480 that stores program codes and data. The memory 480 can be called a computer readable medium.

In Uplink (UL) transmission, the data source 467 is used to provide configuration data relevant to the first radio signal of the present disclosure to the controller/processor 490. The data source 467 represents all protocol layers above the L2 layer, and the first radio signal is generated by the data source 467. The controller/processor 490 provides header compression, encryption, packet segmentation and reordering and multiplexing between a logical channel and a transport channel based on radio resources allocation for the gNB 410, so as to implement the L2 layer protocols used for the user plane and the control plane. The controller/processor 490 is also in charge of HARQ operation, retransmission of a lost packet, and a signaling to the gNB 410. The transmitting processor 455 provides various signal transmitting processing functions used for the L1 layer (that is, PHY). The signal transmitting processing functions include coding and modulating, etc. Modulation symbols are divided into parallel streams and each stream is mapped onto a corresponding multicarrier subcarrier and/or multicarrier symbol for baseband signal generation, which is later mapped from the transmitting processor 455 to the antenna 460 via the transmitter 456 to be transmitted in the form of RF signal. Signals on physical layer (including generation and transmission of the third radio signal of the present disclosure, and processing of the first radio signal on the physical layer) are generated by the transmitting processor 455. The receiver 416 receives an RF signal via a corresponding antenna 420. Each receiver 416 recovers baseband information modulated to the RF carrier, and provides the baseband information to the receiving processor 412. The receiving processor 412 provides various signal receiving processing functions used for the L1 layer (that is, PHY), including receiving of the third radio signal of the present disclosure and of the first radio signal on the physical layer. The signal receiving processing functions also include acquisition of multicarrier symbol streams, demodulation of multicarrier symbols in the multicarrier symbol streams based on each modulation scheme, and then decoding of the demodulated symbols so as to recover data and/or control signals originally transmitted by the UE 450 on a physical channel. And the data and/or control signals are later provided to the controller/processor 440. The controller/processor 440 implements the functionality of the L2 layer. The controller/processor 440 may be associated with the memory 430 that stores program codes and data. The memory 430 can be called a computer readable medium.

In one embodiment, the UE 450 corresponds to the first-type communication node of the present disclosure.

In one embodiment, the gNB 410 corresponds to the second-type communication node of the present disclosure.

In one embodiment, the UE 450 comprises at least one processor and at least one memory, the at least one memory comprises computer program codes; the at least one memory and the computer program codes are configured to be used in collaboration with the at least one processor, the UE 450 at least receives first information and second information; transmits a first radio signal; and monitors a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is the same as the second identity, or the first identity is different from the second identity, the second identity being used to generate a scrambling code for the bit output by the first bit block through channel coding; the first information, the second information, the first radio signal and the first signaling are all transmitted via an air interface.

In one embodiment, the UE 450 comprises a memory that stores computer readable instruction program, the computer readable instruction program generates actions when executed by at least one processor, which include: receiving first information and second information; transmitting a first radio signal; and monitoring a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is the same as the second identity, or the first identity is different from the second identity, the second identity being used to generate a scrambling code for the bit output by the first bit block through channel coding; the first information, the second information, the first radio signal and the first signaling are all transmitted via an air interface.

In one embodiment, the gNB 410 comprises at least one processor and at least one memory, the at least one memory comprises computer program codes; the at least one memory and the computer program codes are configured to be used in collaboration with the at least one processor. The gNB 410 at least transmits first information and second information; receives a first radio signal; and transmits a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is the same as the second identity, or the first identity is different from the second identity, the second identity being used to generate a scrambling code for the bit output by the first bit block through channel coding; the first information, the second information, the first radio signal and the first signaling are all transmitted via an air interface.

In one embodiment, the gNB 410 comprises a memory that stores computer readable instruction program, the computer readable instruction program generates actions when executed by at least one processor, which include: transmitting first information and second information; receiving a first radio signal; and transmitting a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is the same as the second identity, or the first identity is different from the second identity, the second identity being used to generate a scrambling code for the bit output by the first bit block through channel coding; the first information, the second information, the first radio signal and the first signaling are all transmitted via an air interface.

In one embodiment, the receiver 456 (comprising the antenna 460), the receiving processor 452 and the controller/processor 490 are used to receive the first information in the present disclosure.

In one embodiment, the receiver 456 (comprising the antenna 460), the receiving processor 452 and the controller/processor 490 are used to receive the second information in the present disclosure.

In one embodiment, the transmitter 456 (comprising the antenna 460), the transmitting processor 455 and the controller/processor 490 are used to transmit the first radio signal in the present disclosure.

In one embodiment, the receiver 456 (comprising the antenna 460) and the receiving processor 452 are used to receive the first signaling in the present disclosure.

In one embodiment, the receiver 456 (comprising the antenna 460), the receiving processor 452 and the controller/processor 490 are used to receive the second radio signal in the present disclosure.

In one embodiment, the transmitter 456 (comprising the antenna 460), the transmitting processor 455 and the controller/processor 490 are used to transmit the third radio signal in the present disclosure.

In one embodiment, the receiver 456 (comprising the antenna 460) and the receiving processor 452 are used to receive the second signaling in the present disclosure.

In one embodiment, the receiver 456 (comprising the antenna 460), the receiving processor 452 and the controller/processor 490 are used to receive the fourth radio signal in the present disclosure.

In one embodiment, the receiver 456 (comprising the antenna 460) and the receiving processor 452 are used to receive the third signaling in the present disclosure.

In one embodiment, the transmitter 416 (comprising the antenna 420), the transmitting processor 415 and the controller/processor 440 are used to transmit the first information in the present disclosure.

In one embodiment, the transmitter 416 (comprising the antenna 420), the transmitting processor 415 and the controller/processor 440 are used to transmit the second information in the present disclosure.

In one embodiment, the receiver 416 (comprising the antenna 420), the receiving processor 412 and the controller/processor 440 are used to receive the first radio signal in the present disclosure.

In one embodiment, the transmitter 416 (comprising the antenna 420) and the transmitting processor 415 are used to transmit the first signaling in the present disclosure.

In one embodiment, the transmitter 416 (comprising the antenna 420), the transmitting processor 415 and the controller/processor 440 are used to transmit the second radio signal in the present disclosure.

In one embodiment, the receiver 416 (comprising the antenna 420), the receiving processor 412 and the controller/processor 440 are used to receive the third radio signal in the present disclosure.

In one embodiment, the transmitter 416 (comprising the antenna 420) and the transmitting processor 415 are used to transmit the second signaling in the present disclosure.

In one embodiment, the transmitter 416 (comprising the antenna 420), the transmitting processor 415 and the controller/processor 440 are used to transmit the fourth radio signal in the present disclosure.

In one embodiment, the transmitter 416 (comprising the antenna 420) and the transmitting processor 415 are used to transmit the third signaling in the present disclosure.

Embodiment 5

Figure 5:
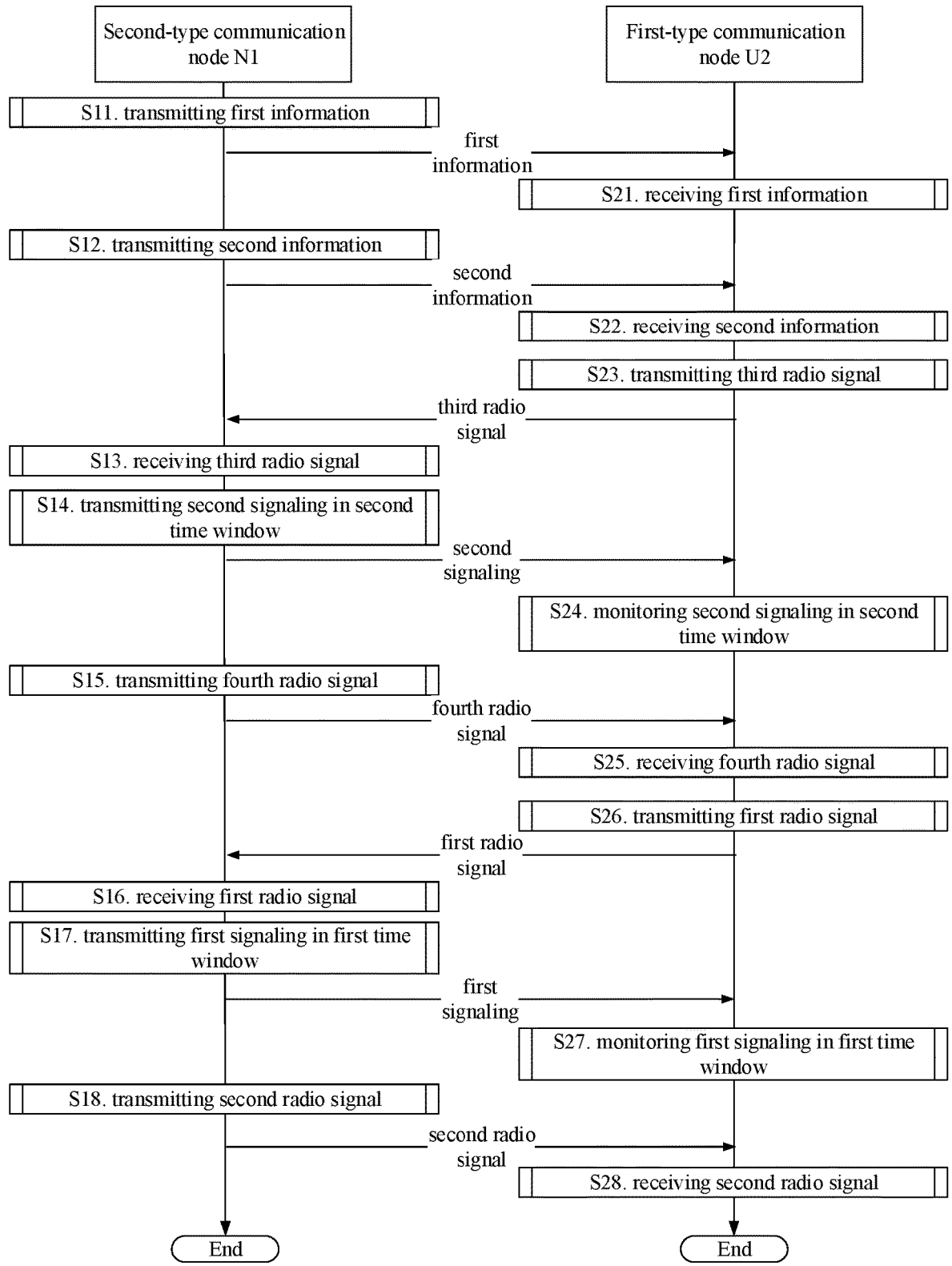
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second-type communication node N1 is a maintenance base station for a serving cell of a first-type communication node U2.

The second-type communication node N1 transmits first information in step S11, transmits second information in step S12, receives a third radio signal in step S13, and transmits a second signaling in step S14, transmits a fourth radio signal in step S15, receives a first radio signal in step S16, transmits a first signaling in a first time window in step S17, and transmits a second radio signal in step S18.

The first-type communication node U2 receives first information in step S21, receives second information in step S22, transmits a third radio signal in step S23, and monitors a second signaling in a second time window in step S24, receives a fourth radio signal in step S25, transmits a first radio signal in step S26, monitors a first signaling in a first time window in step S27, and receives a second radio signal in step S28.

In Embodiment 5, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface; the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface; a time interval between an end of a transmission of the third radio signal and a start of the second time window is a second time interval, and a time length of the second time interval is related to the time length of the first time interval; a third identity is used for monitoring of the second signaling, and a radio resource occupied by the third radio signal is used to determine the third identity; the third radio signal and the second signaling are transmitted via the air interface; the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface.

In one embodiment, the third bit block also carries third information, the third information is used to indicate time-frequency resources occupied by the first radio signal and a modulation and coding scheme employed by the first radio signal, and the third identity is used to generate a scrambling code for a bit output by the third bit block through channel coding.

In one embodiment, the second signaling is a physical-layer signaling.

In one embodiment, the second signaling is transmitted through a PDCCH.

In one embodiment, the second signaling comprises all or part of fields in a piece of DCI.

In one embodiment, the second signaling is detected in a Common Search Space (CSS).

In one embodiment, the second signaling is detected in a UE-specific Search Space (USS).

In one embodiment, the phrase that the second signaling is used to indicate time-frequency resources occupied by the fourth radio signal and a modulation and coding scheme (MCS) employed by the fourth radio signal means that the second signaling is used for directly indicating time-frequency resources occupied by and an MCS of the fourth radio signal.

In one embodiment, the phrase that the second signaling is used to indicate time-frequency resources occupied by the fourth radio signal and a modulation and coding scheme (MCS) employed by the fourth radio signal means that the second signaling is used for indirectly indicating time-frequency resources occupied by and an MCS of the fourth radio signal.

In one embodiment, the phrase that the second signaling is used to indicate time-frequency resources occupied by the fourth radio signal and a modulation and coding scheme (MCS) employed by the fourth radio signal means that the second signaling is used for explicitly indicating time-frequency resources occupied by and an MCS of the fourth radio signal.

In one embodiment, the phrase that the second signaling is used to indicate time-frequency resources occupied by the fourth radio signal and a modulation and coding scheme (MCS) employed by the fourth radio signal means that the second signaling is used for implicitly indicating time-frequency resources occupied by and an MCS of the fourth radio signal.

In one embodiment, the phrase that the third identity is used for monitoring of the second signaling means that the third identity is used for blind detection of the second signaling.

In one embodiment, the phrase that the third identity is used for monitoring of the second signaling means that the third identity is used for scrambling CRC of a PDCCH carrying the second signaling.

In one embodiment, the phrase that the third identity is used for monitoring of the second signaling means that the third identity is used for a Mask for CRC of a PDCCH carrying the second signaling.

In one embodiment, the phrase that the third identity is used for monitoring of the second signaling means that the first-type communication node determines whether the second signaling is detected according to whether CRC of a PDCCH carrying the second signaling is passed, and the third identity is used for scrambling CRC of the PDCCH carrying the second signaling.

Embodiment 6

Figure 6:
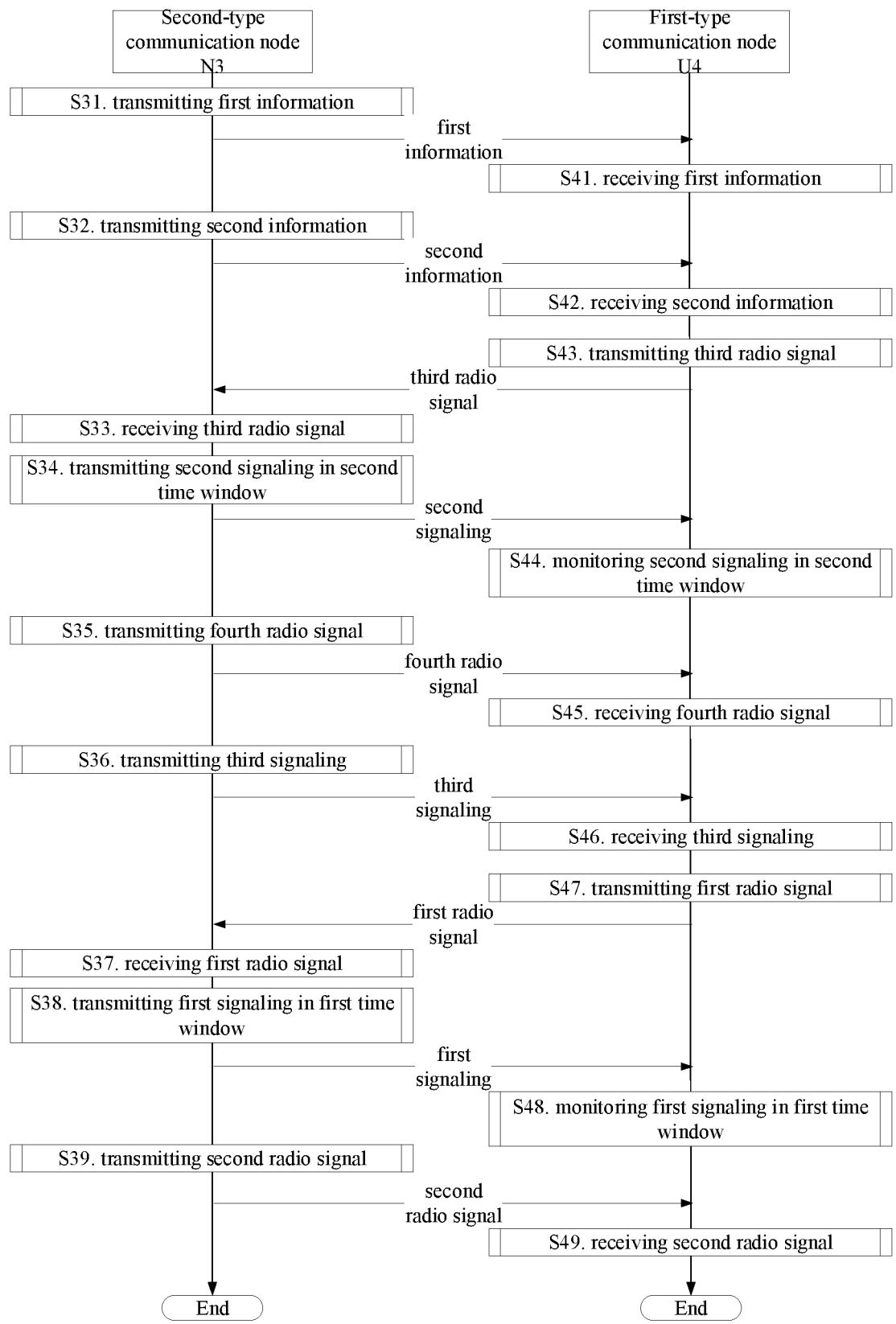
FIG. 6 illustrates another flowchart of radio signal transmission according to one embodiment of the present disclosure.

Embodiment 6 illustrates another flowchart of radio signal transmission according to one embodiment of the present disclosure, as shown in FIG. 6. In FIG. 6, a second-type communication node N3 is a maintenance base station for a serving cell of a first-type communication node U4.

The second-type communication node N3 transmits first information in step S31, transmits second information in step S32, and receives a third radio signal in step S33, transmits a second signaling in a second time window in step S34, transmits a fourth radio signal in step S35, and transmits a third signaling in step S36, receives a first radio signal in step S37, transmits a first signaling in a first time window in step S38, and transmits a second radio signal in step S39.

The first-type communication node U4 receives first information in step S41, receives second information in step S42, and transmits a third radio signal in step S43, monitors a second signaling in a second time window in step S44, receives a fourth radio signal in step S45, and receives a third signaling in step S46, transmits a first radio signal in step S47, monitors a first signaling in a first time window in step S48, and receives a second radio signal in step S49.

In Embodiment 6, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface; the first signaling is used to indicate time-frequency resources occupied by and a modulation and coding scheme of the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface; a time interval between an end of a transmission of the third radio signal and a start of the second time window is a second time interval, and a time length of the second time interval is related to the time length of the first time interval; a third identity is used for monitoring of the second signaling, and a radio resource occupied by the third radio signal is used to determine the third identity; the third radio signal and the second signaling are transmitted via the air interface; the second signaling is used to indicate time-frequency resources occupied by and a modulation and coding scheme of the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface; the third signaling is used to indicate time-frequency resources occupied, a redundancy version (RV) applied and a modulation and coding scheme employed by the first radio signal.

In one embodiment, the third bit block also carries third information, the third information is used to indicate time-frequency resources occupied by and a modulation and coding scheme of the first radio signal, and the third identity is used to generate a scrambling code for a bit output by the third bit block through channel coding.

In one embodiment, the third signaling is a physical-layer signaling.

In one embodiment, the third signaling is transmitted through a PDCCH.

In one embodiment, the third signaling carries all or part of fields in a piece of DCI.

In one embodiment, the third signaling comprises Uplink Grant.

In one embodiment, a start time of receiving of the third signaling is earlier than a start time of receiving of the first signaling.

In one embodiment, the third signaling is used to schedule a retransmission of a Msg-3.

In one embodiment, the third signaling carries a piece of DCI, and a New Data Indicator (NDI) field in the DCI carried by the third signaling is not reversed.

In one embodiment, the third signaling carries a piece of DCI, and an NDI field in the DCI carried by the third signaling indicates that the first radio signal is a retransmission.

In one embodiment, a Redundancy Version (RV) employed by the first radio signal is unequal to 0.

In one embodiment, a RV employed by the first radio signal is equal to one of 1, 2 or 3.

Embodiment 7

Figure 7:
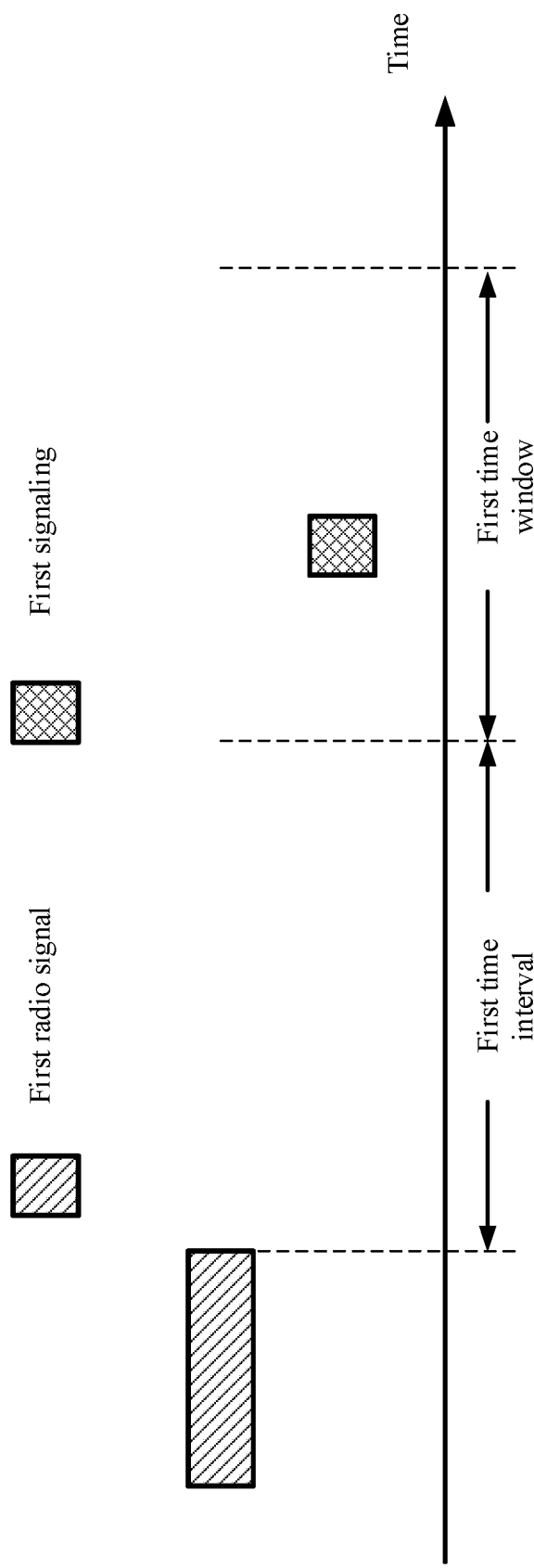
FIG. 7 illustrates a schematic diagram of relationship between a first time interval and a first time window according to one embodiment of the present disclosure.

Embodiment 7 illustrates a schematic diagram of relationship between a first time interval and a first time window according to one embodiment of the present disclosure, as shown in FIG. 7. In FIG. 7, the horizontal axis represents time, the slash-filled rectangle represents a first radio signal, while the cross-filled square represents a first signaling.

In Embodiment 7, the first information of the present disclosure is used to determine a time length of the first time window, a time interval between an end of a transmission of the first radio signal and a start of the first time window is a first time interval, and the second information is used to determine a time length of the first time interval.

In one embodiment, the first time window comprises a positive integer number of contiguous subframes.

In one embodiment, the first time window comprises a positive integer number of contiguous slots.

In one embodiment, the first time window comprises a positive integer number of contiguous multicarrier symbols, i.e., OFDM symbols.

In one embodiment, the time length of the first time window is measured by ms.

In one embodiment, the time length of the first time window is measured by a number of slots.

In one embodiment, the time length of the first time window is equal to a time length identified by IE "ra-ContentionResolutionTimer" in 3GPP TS36.331.

In one embodiment, the time length of the first time window is equal to a time length identified by IE "ra-ContentionResolutionTimer" in 3GPP TS38.331.

In one embodiment, the first-type communication node of the present disclosure performs blind detection on the first signaling in the first time window.

In one embodiment, the first-type communication node of the present disclosure performs blind detection on the first signaling based on an RNTI in the first time window.

In one embodiment, the first-type communication node of the present disclosure monitors the first signaling by performing blind detection on an RNTI scrambling CRC of the first signaling in the first time window.

In one embodiment, the time length of the first time interval is greater than 0 ms.

In one embodiment, the time length of the first time interval is equal to 0 ms.

In one embodiment, an end of a transmission of the first radio signal is no later than a start of the first time window.

In one embodiment, an end of a transmission of the first radio signal is earlier than a start of the first time window.

Embodiment 8

Figure 8:
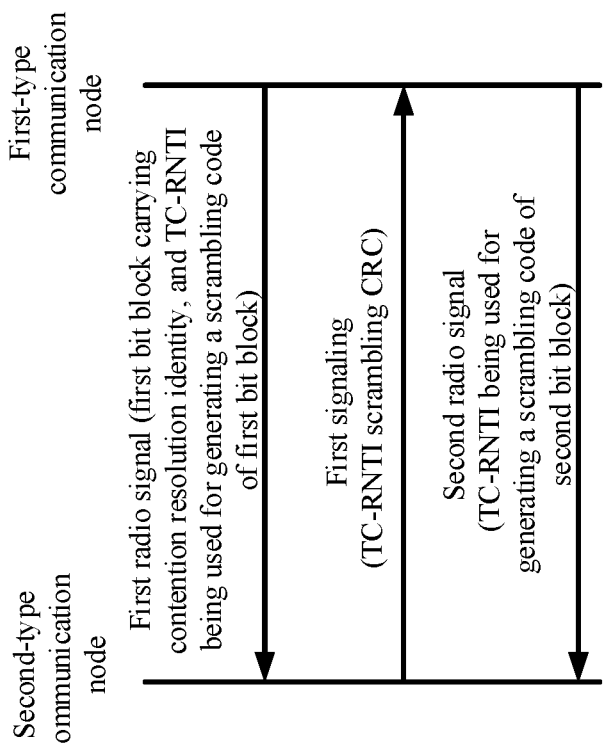
FIG. 8 illustrates a schematic diagram of relationship between a first identity and a second identity according to one embodiment of the present disclosure.
Figure 8:
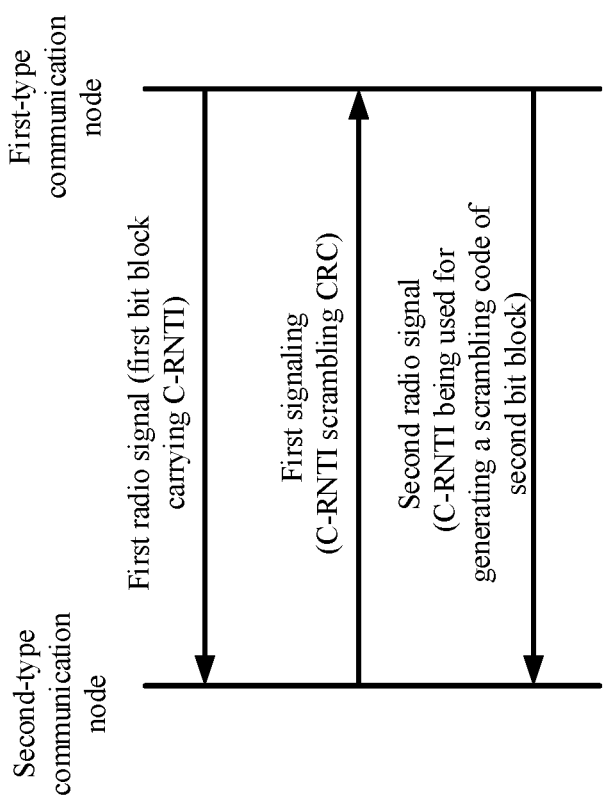

Embodiment 8 illustrates a schematic diagram of relationship between a first identity and a second identity according to one embodiment of the present disclosure, as shown in FIG. 8. In FIG. 8, Case A corresponds to a non-contention-based random-access process, where a first identity is a C-RNTI, and a second identity is a C-RNTI the same as the first identity; Case B corresponds to a contention-based random-access process, where a first identity is a Contention Resolution Identity, and a second identity is a TC-RNTI.

In Embodiment 8, a bit output by a first bit block through channel coding is used to generate the first radio signal of the present disclosure, the first bit block carries a first identity, and a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity.

In one embodiment, the first identity is the same as the second identity, the second identity being used to generate a scrambling code for the bit output by the first bit block through channel coding.

In one embodiment, the first identity is the same as the second identity, and a TC-RNTI received by the first-type communication node is used to generate a scrambling code for the bit output by the first bit block through channel coding.

Embodiment 9

Figure 9:
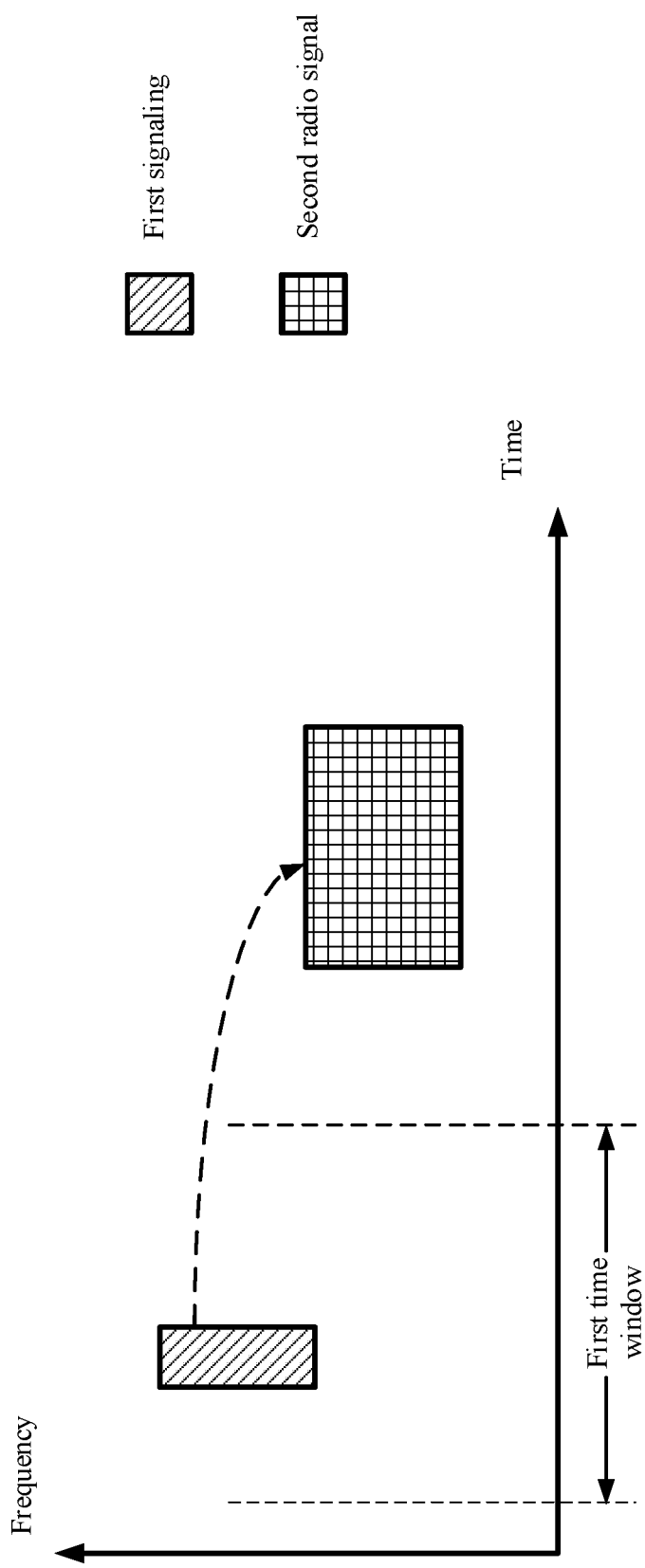
FIG. 9 illustrates a schematic diagram of relationship between a first signaling and a second radio signal according to one embodiment of the present disclosure.

Embodiment 9 illustrates a schematic diagram of relationship between a first signaling and a second radio signal according to one embodiment of the present disclosure, as shown in FIG. 9. In FIG. 9, the horizontal axis represents time, while the vertical axis represents frequency; the slash-filled rectangle represents a first signaling, and the grid-filled rectangle represents a second radio signal.

In Embodiment 9, the first signaling of the present disclosure is used to indicate time-frequency resources occupied by and a modulation and coding scheme of the second radio signal in the present disclosure, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

In one embodiment, the first signaling is used to indicate time-frequency resources occupied by and a modulation and coding scheme of the second radio signal means that the first signaling is used for directly indicating time-frequency resources occupied by and a modulation and coding scheme (MCS) of the second radio signal.

In one embodiment, the first signaling is used to indicate time-frequency resources occupied by and a modulation and coding scheme of the second radio signal means that the first signaling is used for indirectly indicating time-frequency resources occupied by and a modulation and coding scheme of the second radio signal.

In one embodiment, the first signaling is used to indicate time-frequency resources occupied by and a modulation and coding scheme of the second radio signal means that the first signaling is used for explicitly indicating time-frequency resources occupied by and a modulation and coding scheme of the second radio signal.

In one embodiment, the first signaling is used to indicate time-frequency resources occupied by and a modulation and coding scheme of the second radio signal means that the first signaling is used for implicitly indicating time-frequency resources occupied by and a modulation and coding scheme of the second radio signal.

In one embodiment, the second radio signal carries a Msg-4 (random-access message-4).

In one embodiment, the second radio signal is used for random-access process.

In one embodiment, the second radio signal is transmitted through a DL-SCH.

In one embodiment, the second radio signal is transmitted through a PDSCH.

In one embodiment, a bit output by the second bit block through LDPC channel coding is used to generate the second radio signal.

In one embodiment, a bit output by the second bit block through Polar channel coding is used to generate the second radio signal.

In one embodiment, a bit output by the second bit block through Turbo channel coding is used to generate the second radio signal.

In one embodiment, a bit output by the second bit block through Convolutional channel coding is used to generate the second radio signal.

In one embodiment, a bit output by the second bit block through LDPC channel coding in 3GPP TS38.212, section 5.3.2 is used to generate the second radio signal.

In one embodiment, the second radio signal is obtained after the bit output by the second bit block through channel coding sequentially goes through Rate Matching, Concatenation, Scrambling, a Modulation Mapper, a Layer Mapper, Precoding, a Resource Element Mapper, and Baseband Signal Generation, as well as Modulation and Upconversion.

In one embodiment, the second radio signal is obtained after the bit output by the second bit block through channel coding sequentially goes through Rate Matching and Concatenation with other bits, and then Scrambling, a Modulation Mapper, a Layer Mapper, Precoding, a Resource Element Mapper and Baseband Signal Generation, as well as Modulation and Upconversion.

In one embodiment, the second bit block is transferred from a higher layer to a physical layer.

In one embodiment, the second bit block is all or part of a Transport Block (TB).

In one embodiment, the second bit block is obtained by a TB through Cyclic Redundancy Check (CRC) insertion.

In one embodiment, the second bit block is obtained by a TB through transport block CRC insertion, segmentation and code block CRC insertion in sequence.

In one embodiment, the second bit block is all or part of a Code Block Group (CBG).

In one embodiment, the second bit block is all or part of a Code Block (CB).

In one embodiment, the second bit block carries a Msg-4.

In one embodiment, the phrase that the second bit block carries the first identity means that the first identity serves as partial pre-defined fields in the second bit block.

In one embodiment, the phrase that the second bit block carries the first identity means that the second bit block comprises a Medium Access Control (MAC) Service Data Unit (SDU), the MAC SDU comprising fields in the first identity.

In one embodiment, the phrase that the second identity is used to generate a scrambling code for the bit output by the second bit block through channel coding means that the second identity is used to initialize a scrambling code of the bit output by the second bit block through channel coding.

In one embodiment, the phrase that the second identity is used to generate a scrambling code for the bit output by the second bit block through channel coding means that the second identity is used to initialize a generation register for a scrambling code of the bit output by the second bit block through channel coding.

In one embodiment, the process that the second identity is used to generate a scrambling code for the bit output by the second bit block through channel coding is completed through the following formula:

$$c_{init} = n_{RNTI} \cdot 2^{15} + n_{ID}$$

Herein, the $n_{RNTI}$ identifies the second identity, the $n_{ID} \in \{0, 1, \ldots, 1023\}$ is configured by a higher-layer signaling or is equal to a physical celling ID, and the $c_{init}$ is used to initialize a generation register for a scrambling code of the bit output by the second bit block through channel coding, which the second identity is used to generate.

Embodiment 10

Figure 10:
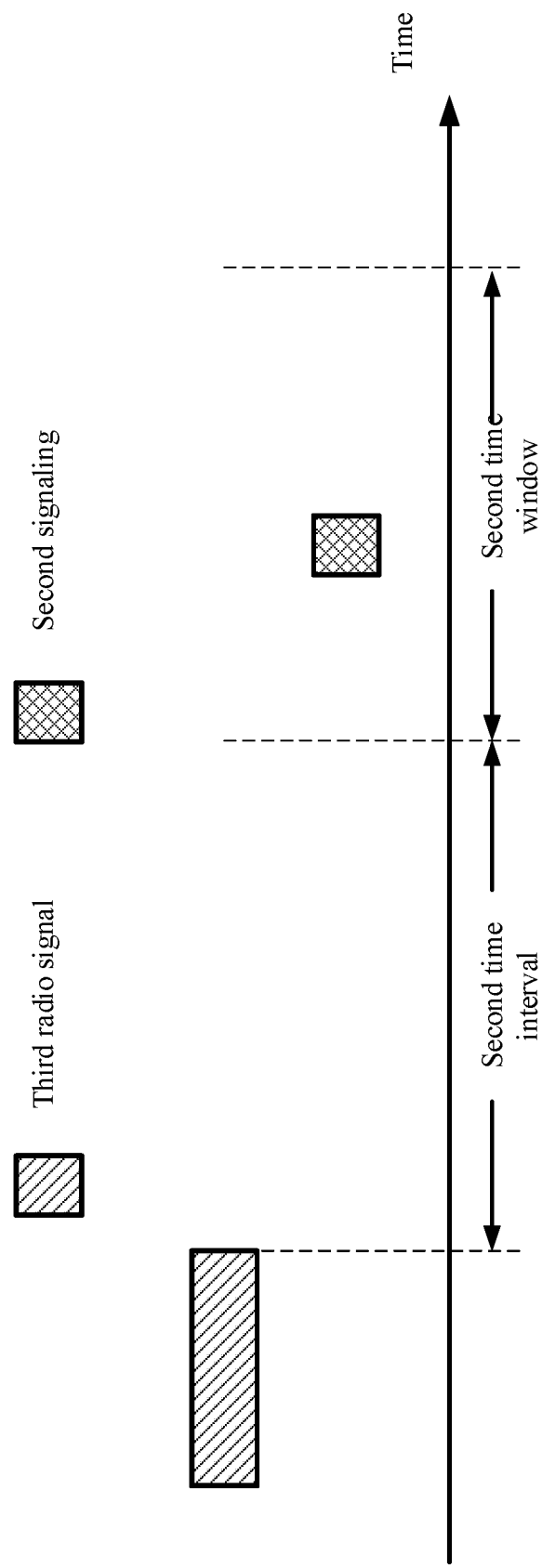
FIG. 10 illustrates a schematic diagram of relationship between a second time interval and a second time window according to one embodiment of the present disclosure.

Embodiment 10 illustrates a schematic diagram of relationship between a second time interval and a second time window according to one embodiment of the present disclosure, as shown in FIG. 10. In FIG. 10, the horizontal axis represents time, the slash-filled rectangle represents a third radio signal, and the cross-filled square represents a second signaling.

In Embodiment 10, the second signaling of the present disclosure is detected in the second time window of the present disclosure, a time interval between an end of a transmission of the third radio signal of the present disclosure and a start of the second time window is a second time window, and a time length of the second time interval is related to the time length of the first time interval; a third identity is used for monitoring of the second signaling, and a radio resource occupied by the third radio signal is used to determine the third identity; the third radio signal and the second signaling are transmitted via the air interface.

In one embodiment, an end of a transmission of the third radio signal is no later than a start time of the second time window.

In one embodiment, an end of a transmission of the third radio signal is earlier than a start time of the second time window.

In one embodiment, the phrase that a time length of the second time interval is related to the time length of the first time interval means that the second information is used to determine both the time length of the second time interval and the time length of the first time interval.

In one embodiment, the phrase that a time length of the second time interval is related to the time length of the first time interval means that the time length of the second time interval is equal to the time length of the first time interval.

In one embodiment, the phrase that a time length of the second time interval is related to the time length of the first time interval means that the time length of the second time interval is linear with the time length of the first time interval.

In one embodiment, the phrase that a time length of the second time interval is related to the time length of the first time interval means that the time length of the second time interval is in proportion to the time length of the first time interval.

In one embodiment, the phrase that a time length of the second time interval is related to the time length of the first time interval means that the time length of the second time interval is equal to a sum of a first duration offset and the time length of the first time interval, the first duration offset is a pre-defined time length.

In one embodiment, the time length of the second time window is pre-defined.

In one embodiment, the time length of the second time window is a fixe value.

In one embodiment, the time length of the second time window is configurable.

In one embodiment, the second time window is a Random Access Response (RAR) window.

In one embodiment, the time length of the second time window is a length configured for IE "ra-ResponseWindow" in 3GPP TS 38.331.

In one embodiment, the time length of the second time window is a length configured for IE "ra-ResponseWindow" in 3GPP TS 36.331.

In one embodiment, the third radio signal is transmitted through a Physical Random Access Channel (PRACH).

In one embodiment, the third radio signal carries a Preamble.

In one embodiment, the third radio signal is transmitted through a Random Access Channel (RACH).

In one embodiment, the third radio signal is generated by a characteristic sequence, and the characteristic sequence is either a Zadoff-Chu (ZC) sequence or a pseudo-random sequence.

In one embodiment, the third radio signal is generated by a characteristic sequence, and the characteristic sequence is one of an integer number of orthogonal sequences or non-orthogonal sequences.

In one embodiment, the radio resource occupied by the third radio signal refers to at least one of time-frequency resource or code-domain resource.

In one embodiment, the radio resource occupied by the third radio signal refers to at least one of a characteristic sequence for generating the third radio signal or time-frequency resource transmitting the third radio signal.

In one embodiment, the third identity is a non-negative binary integer with 16 digits.

In one embodiment, the third identity is a Random Access Radio Network Temporary Identity (RA-RNTI).

In one embodiment, the phrase that a radio resource occupied by the third radio signal is used to determine the third identity means that the radio resource occupied by the third radio signal is used by the first-type communication node for determining the third identity.

In one embodiment, the phrase that a radio resource occupied by the third radio signal is used to determine the third identity means that the radio resource occupied by the third radio signal is used by the first-type communication node for determining the third identity following a given mapping rule.

In one embodiment, the phrase that a radio resource occupied by the third radio signal is used to determine the third identity means that the radio resource occupied by the third radio signal determines the third identity according to the following calculation:

$$RA\text{-}RNTI = 1 + s\_id + 14*t\_id + 14*X*f\_id + 14*X*Y*ul\_carrier\_id$$

Herein, RA-RNTI represents the third identity; s_id refers to an index of a first OFDM symbol comprised in the radio resource occupied by the third radio signal among a slot to which the first OFDM symbol belongs; t_id refers to an index of a first slot comprised by or comprising the radio resource occupied by the third radio signal among a system frame to which the first slot belongs; f_id is an index of the third radio signal in frequency domain, while ul_carrier_id is an index of an uplink carrier to which the third radio signal belongs (this index is equal to 0 for a normal carrier, and is equal to 1 for a supplementary uplink carrier); values of X and Y are pre-defined or can be configured.

Embodiment 11

Figure 11:
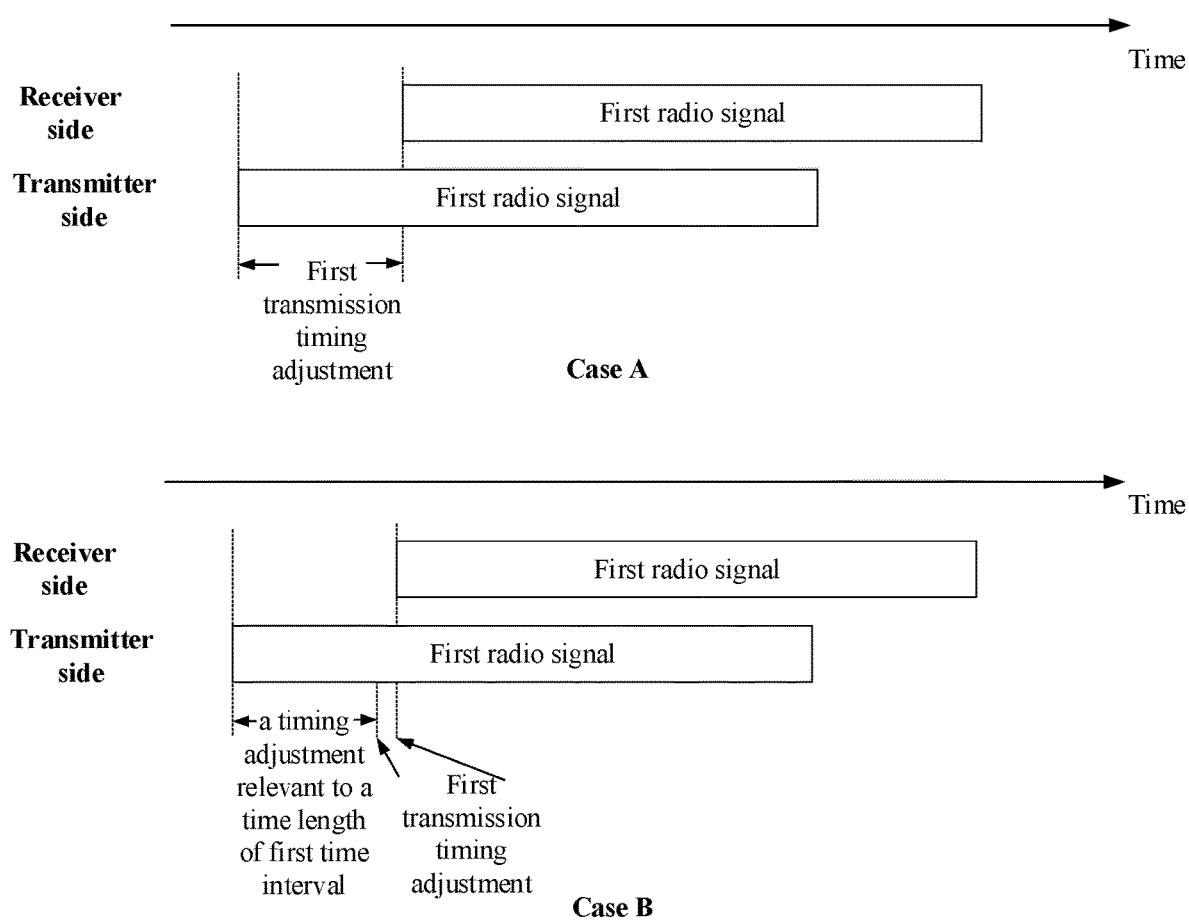
FIG. 11 illustrates a schematic diagram of relationship between a first radio signal and a first transmission timing adjustment according to one embodiment of the present disclosure.

Embodiment 11 illustrates a schematic diagram of relationship between a first radio signal and a first transmission timing adjustment according to one embodiment of the present disclosure, as shown in FIG. 11. In FIG. 11, the horizontal axis represents time. In Case A, a first transmission timing adjustment is used to determine a transmission timing for a first radio signal, while in Case B, a first transmission timing adjustment and a timing adjustment relevant to the time length of a first time interval are jointly used to determine a transmission timing for a first radio signal.

In Embodiment 11, a bit output by a third bit block through channel coding is used to generate the fourth radio signal of the present disclosure, the third bit block carries the second identity of the present disclosure, and the third bit block also carries a first transmission timing adjustment, the third bit block comprising a positive integer number of bit(s); a transmission timing for the first radio signal in the present disclosure is related to both the first transmission timing adjustment and the time length of the first time interval in the present disclosure.

In one embodiment, the fourth radio signal carries a Msg-2 (random-access message 2).

In one embodiment, the fourth radio signal is used for random-access process.

In one embodiment, the fourth radio signal is transmitted through a DL-SCH.

In one embodiment, the fourth radio signal is transmitted through a PDSCH.

In one embodiment, a bit output by the third bit block through LDPC channel coding is used to generate the fourth radio signal.

In one embodiment, a bit output by the third bit block through Polar channel coding is used to generate the fourth radio signal.

In one embodiment, a bit output by the third bit block through Turbo channel coding is used to generate the fourth radio signal.

In one embodiment, a bit output by the third bit block through Convolutional channel coding is used to generate the fourth radio signal.

In one embodiment, a bit output by the third bit block through LDPC channel coding in 3GPP TS38.212, section 5.3.2 is used to generate the fourth radio signal.

In one embodiment, the fourth radio signal is obtained after the bit output by the third bit block through channel coding sequentially goes through Rate Matching, Concatenation, Scrambling, a Modulation Mapper, a Layer Mapper, Precoding, a Resource Element Mapper, and Baseband Signal Generation, as well as Modulation and Upconversion.

In one embodiment, the fourth radio signal is obtained after the bit output by the third bit block through channel coding sequentially goes through Rate Matching and Concatenation with other bits, and then Scrambling, a Modulation Mapper, a Layer Mapper, Precoding, a Resource Element Mapper and Baseband Signal Generation, as well as Modulation and Upconversion.

In one embodiment, the third bit block is transferred from a higher layer to a physical layer.

In one embodiment, the third bit block is all or part of a Transport Block (TB).

In one embodiment, the third bit block is obtained by a TB through Cyclic Redundancy Check (CRC) insertion.

In one embodiment, the third bit block is obtained by a TB through transport block CRC insertion, segmentation and code block CRC insertion in sequence.

In one embodiment, the third bit block is all or part of a Code Block Group (CBG).

In one embodiment, the third bit block is all or part of a Code Block (CB).

In one embodiment, the third bit block carries a Msg-2.

In one embodiment, the phrase that the third bit block carries the second identity means that the second identity serves as partial pre-defined fields in the third bit block.

In one embodiment, the phrase that the third bit block carries the second identity means that the third bit block comprises a Medium Access Control (MAC) Service Data Unit (SDU), the MAC SDU comprising fields in the second identity.

In one embodiment, the phrase that the third bit block carries the first transmission timing adjustment means that the first transmission timing adjustment serves as partial pre-defined fields in the third bit block.

In one embodiment, the phrase that the third bit block carries the first transmission timing adjustment means that the third bit block comprises a MAC SDU, the MAC SDU comprising fields in the first transmission timing adjustment.

In one embodiment, the first transmission timing adjustment is a Timing Advance (TA) comprised by Random Access Response (RAR).

In one embodiment, a transmission timing for the first radio signal is determined by a TA value of the first radio signal.

In one embodiment, the first transmission timing adjustment is a non-negative number.

In one embodiment, the first transmission timing adjustment is measured by ms.

In one embodiment, a minimum adjustment step size for the first transmission timing adjustment is measured by ms.

In one embodiment, the first transmission timing adjustment is measured by µs.

In one embodiment, a minimum adjustment step size for the first transmission timing adjustment is measured by µs.

In one embodiment, a minimum adjustment step size for the first transmission timing adjustment is dependent on a Subcarrier Spacing (SCS) of the fourth radio signal.

In one embodiment, the phrase that a transmission timing for the first radio signal is related to both the first transmission timing adjustment and the time length of the first time interval means that the first transmission timing adjustment is related to the time length of the first time interval, and a transmission timing for the first radio signal is related to the first transmission timing adjustment.

In one embodiment, the phrase that a transmission timing for the first radio signal is related to both the first transmission timing adjustment and the time length of the first time interval means that an adjustment step size for the first transmission timing adjustment is related to the time length of the first time interval, and a transmission timing for the first radio signal is related to the first transmission timing adjustment.

In one embodiment, the phrase that a transmission timing for the first radio signal is related to both the first transmission timing adjustment and the time length of the first time interval means that a sum of the first transmission timing adjustment and the time length of the first time interval is used to determine a transmission timing for the first radio signal.

In one embodiment, the phrase that a transmission timing for the first radio signal is related to both the first transmission timing adjustment and the time length of the first time interval means that a transmission timing for the first radio signal is linear with the first transmission timing adjustment, and the transmission timing for the first radio signal is linear with the time length of the first time interval.

In one embodiment, the phrase that a transmission timing for the first radio signal is related to both the first transmission timing adjustment and the time length of the first time interval means that a sum of the first transmission timing adjustment and a second transmission timing adjustment is used to determine a transmission timing for the first radio signal, wherein the second transmission timing adjustment is linear with the time length of the first time interval.

In one embodiment, the phrase that a transmission timing for the first radio signal is related to both the first transmission timing adjustment and the time length of the first time interval means that a sum of the first transmission timing adjustment and a second transmission timing adjustment is used to determine a transmission timing for the first radio signal, and the second information is used to determine both the second transmission timing adjustment and the time length of the first time interval.

In one embodiment, the phrase that a transmission timing for the first radio signal is related to both the first transmission timing adjustment and the time length of the first time interval means that a sum of the first transmission timing adjustment and a second transmission timing adjustment is used to determine a transmission timing for the first radio signal, the second information indicates a reference time length, and the reference time length is used to determine both the second transmission timing adjustment and the time length of the first time interval.

In one embodiment, the phrase that a transmission timing for the first radio signal is related to both the first transmission timing adjustment and the time length of the first time interval means that a sum of the first transmission timing adjustment and a second transmission timing adjustment is used to determine a transmission timing for the first radio signal, the second information indicates a reference height of a transmitter of the second information, and the reference height is used to determine both the second transmission timing adjustment and the time length of the first time interval.

In one embodiment, the phrase that a transmission timing for the first radio signal is related to both the first transmission timing adjustment and the time length of the first time interval means that Timing Advance (TA) of the first radio signal relative to downlink receiving of the first-type communication node is related to both the first transmission timing adjustment and the time length of the first time interval.

Embodiment 12

Figure 12:
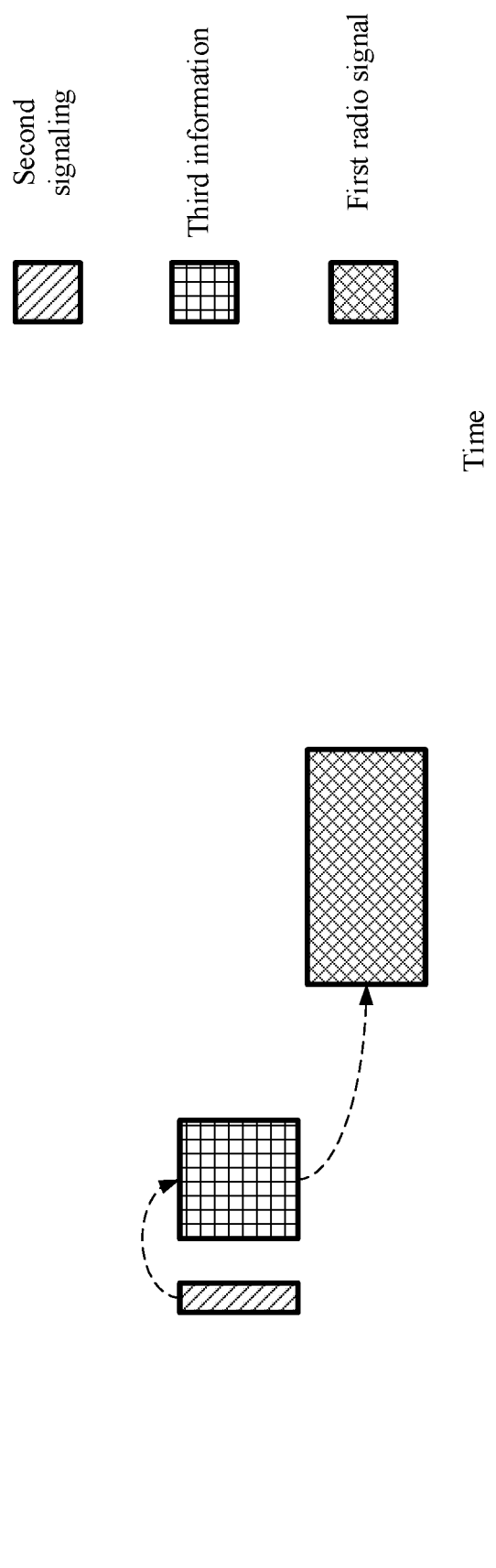
FIG. 12 illustrates a schematic diagram of relations between a second signaling, third information and a first radio signal according to one embodiment of the present disclosure.

Embodiment 12 illustrates a schematic diagram of relations between a second signaling, third information and a first radio signal according to one embodiment of the present disclosure, as shown in FIG. 12. In FIG. 12, the horizontal axis represents time, the slash-filled rectangle represents a second signaling, the grid-filled square represents third information, and the cross-filled rectangle represents a first radio signal.

In Embodiment 12, the second signaling of the present disclosure is used to indicate time-frequency resources occupied by and a modulation and coding scheme of the fourth radio signal, a bit output by a third bit block through channel coding is used to generate the fourth radio signal, the third bit block also carries third information, and the third information is used to indicate time-frequency resources occupied by and a modulation and coding scheme of the first radio signal, and the third identity is used to generate a scrambling code for a bit output by the third bit block through channel coding.

In one embodiment, the phrase that the third bit block also carries the third information means that the third information serves as partial pre-defined fields in the third bit block.

In one embodiment, the phrase that the third bit block also carries the third information means that the third bit block comprises a Medium Access Control (MAC) Packet Data Unit (PDU), and the MAC PDU comprises fields in the third information.

In one embodiment, the third information comprises all or part of Uplink Grant.

In one embodiment, the third information comprises all or part of Uplink Grant in Random Access Response (RAR).

In one embodiment, the third information is transmitted through MAC payload of the third bit block.

In one embodiment, the third information is a piece of MAC layer information.

In one embodiment, the phrase that the third information is used to indicate time-frequency resources occupied by and a modulation and coding scheme of the first radio signal means that the third information is used to directly indicate time-frequency resources occupied by and a modulation and coding scheme of the first radio signal.

In one embodiment, the phrase that the third information is used to indicate time-frequency resources occupied by and a modulation and coding scheme of the first radio signal means that the third information is used to indirectly indicate time-frequency resources occupied by and a modulation and coding scheme of the first radio signal.

In one embodiment, the phrase that the third information is used to indicate time-frequency resources occupied by and a modulation and coding scheme of the first radio signal means that the third information is used to explicitly indicate time-frequency resources occupied by and a modulation and coding scheme of the first radio signal.

In one embodiment, the phrase that the third information is used to indicate time-frequency resources occupied by and a modulation and coding scheme of the first radio signal means that the third information is used to implicitly indicate time-frequency resources occupied by and a modulation and coding scheme of the first radio signal.

In one embodiment, the phrase that the third identity is used to generate a scrambling code for a bit output by the third bit block through channel coding means that the third identity is used to initialize a scrambling code of a bit output by the third bit block through channel coding.

In one embodiment, the phrase that the third identity is used to generate a scrambling code for a bit output by the third bit block through channel coding means that the third identity is used to initialize a generation register for a scrambling code of a bit output by the third bit block through channel coding.

In one embodiment, the process that the third identity is used to generate a scrambling code for a bit output by the third bit block through channel coding is completed through the following formula:

$$c_{init} = n_{RNTI} \cdot 2^{15} + n_{ID}$$

Herein, the $n_{RNTI}$ identifies the third identity, the $n_{ID} \in \{0, 1, \ldots, 1023\}$ is configured by a higher-layer signaling or is equal to a physical celling ID, and the $c_{init}$ is used to initialize a generation register for a scrambling code of the bit output by the third bit block through channel coding, which the third identity is used to generate.

Embodiment 13

Figure 13:
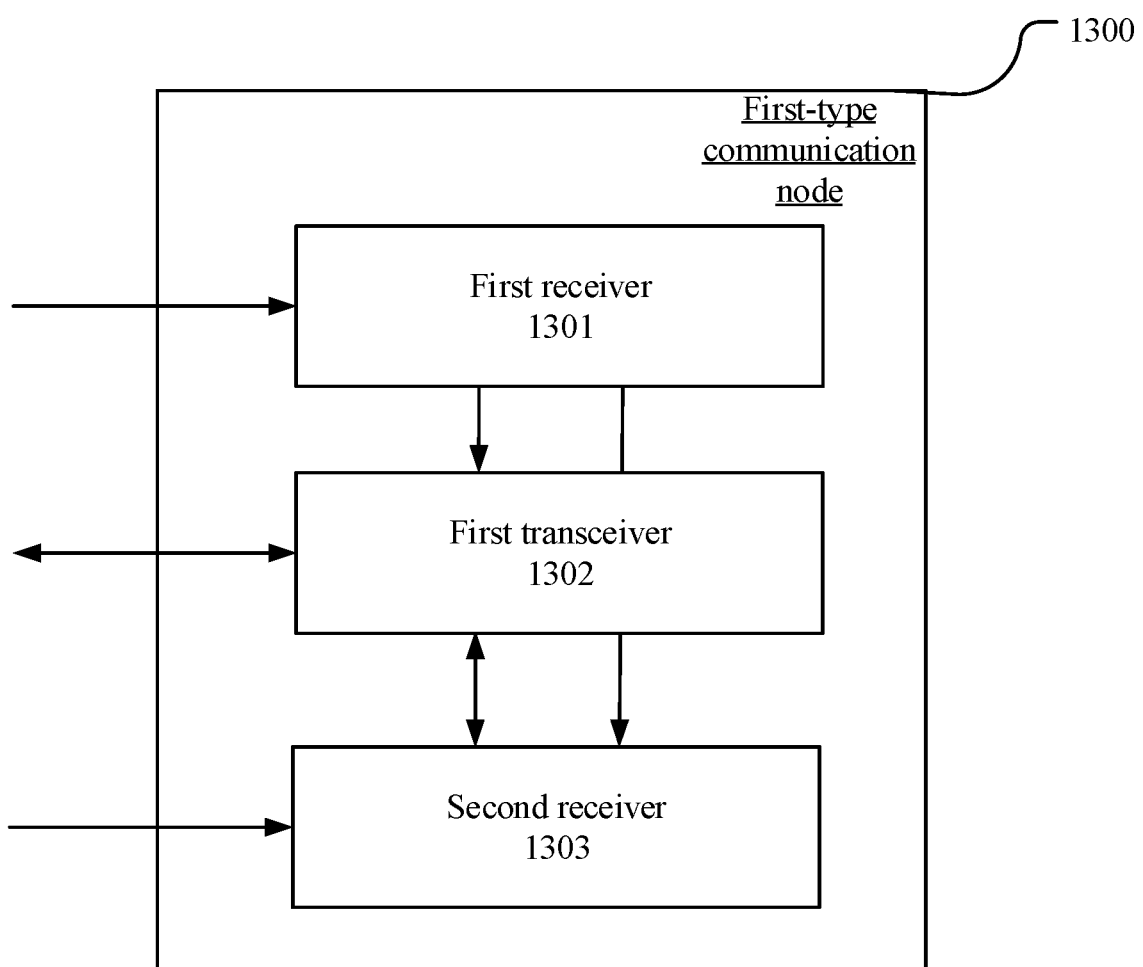
FIG. 13 illustrates a structure block diagram of a processing device in a first-type communication node according to one embodiment of the present disclosure.

Embodiment 13 illustrates a structure block diagram of a processing device in a first-type communication node, as shown in FIG. 13. In FIG. 13, a first-type communication node's processing device 1300 is mainly composed of a first receiver 1301, a first transceiver 1302 and a second receiver 1303. The first receiver 1301 comprises the transmitter/receiver 456 (comprising the antenna 460), the receiving processor 452 and the controller/processor 490 in FIG. 4 of the present disclosure; the first transceiver 1302 comprises the transmitter/receiver 456 (comprising the antenna 460), the receiving processor 452, the transmitting processor 455 and the controller/processor 490 in FIG. 4 of the present disclosure; the second receiver 1303 comprises the transmitter/receiver 456 (comprising the antenna 460) and the receiving processor 452.

In Embodiment 13, the first receiver 1301 receives first information and second information; the first transceiver 1302 transmits a first radio signal; and the second receiver 1303 monitors a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

In one embodiment, the first transceiver 1302 also receives a second radio signal; herein, the first signaling is used to indicate time-frequency resources occupied by and a modulation and coding scheme of the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

In one embodiment, the first transceiver 1302 also transmits a third radio signal; and the second receiver 1303 also monitors a second signaling in a second time window; herein, a time interval between an end of a transmission of the third radio signal and a start of the second time window is a second time interval, and a time length of the second time interval is related to the time length of the first time interval; a third identity is used for monitoring of the second signaling, and a radio resource occupied by the third radio signal is used to determine the third identity; the third radio signal and the second signaling are transmitted via the air interface.

In one embodiment, the first transceiver 1302 also receives a fourth radio signal; herein, the second signaling is used to indicate time-frequency resources occupied by and a modulation and coding scheme of the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface.

In one embodiment, the first transceiver 1302 also receives a fourth radio signal; herein, the second signaling is used to indicate time-frequency resources occupied by and a modulation and coding scheme of the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface; the third bit block also carries third information, the third information is used to indicate time-frequency resources occupied by and a modulation and coding scheme of the first radio signal, and the third identity is used to generate a scrambling code for a bit output by the third bit block through channel coding.

In one embodiment, the second receiver 1303 also receives a third signaling; herein, the third signaling is used to indicate time-frequency resources occupied, a redundancy version (RV) applied and a modulation and coding scheme employed by the first radio signal.

Embodiment 14

Figure 14:
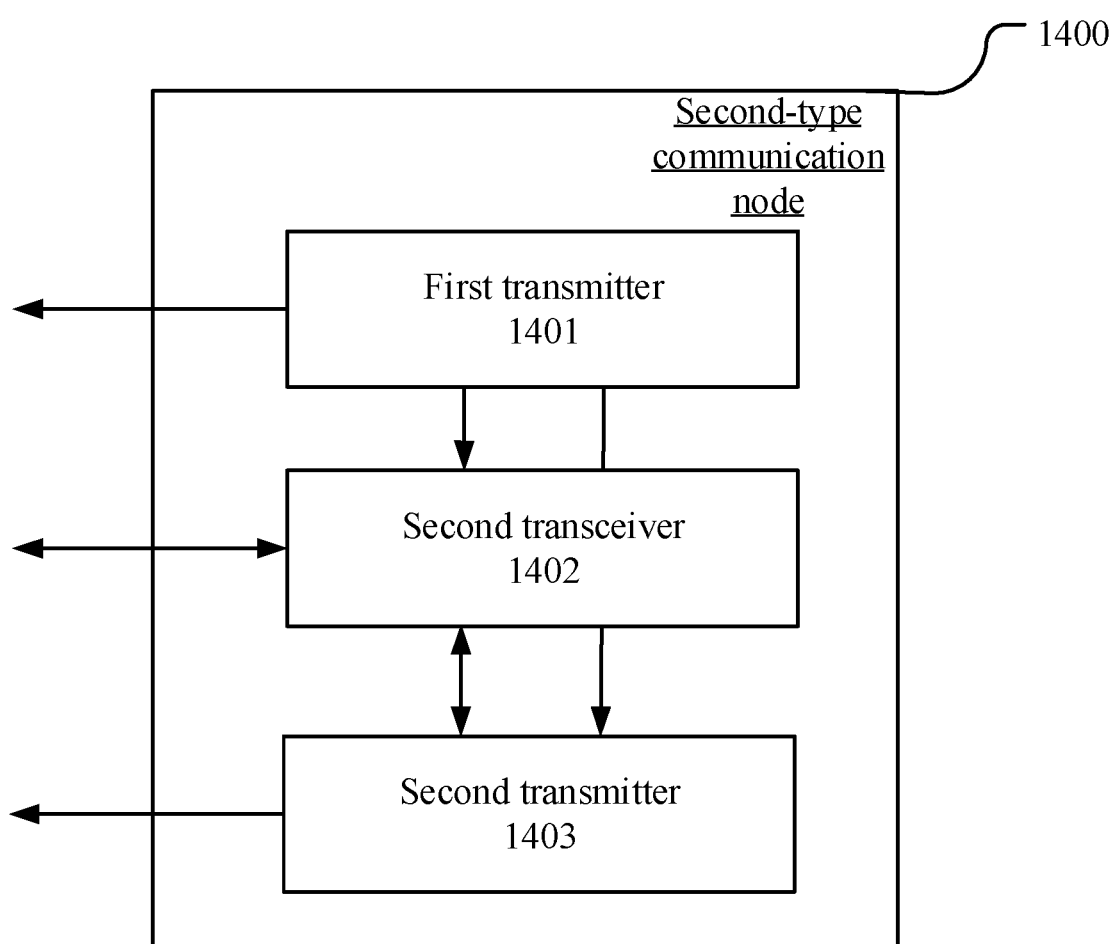
FIG. 14 illustrates a structure block diagram of a processing device in a second-type communication node according to one embodiment of the present disclosure.

Embodiment 14 illustrates a structure block diagram of a processing device in a second-type communication node, as shown in FIG. 14. In FIG. 14, a second-type communication node 1400 is mainly composed of a first transmitter 1401, a second transceiver 1402 and a second transmitter 1403. The first transmitter 1401 comprises the transmitter/receiver 416 (comprising the antenna 420), the transmitting processor 415 and the controller/processor 440 in FIG. 4 of the present disclosure; the second transceiver 1402 comprises the transmitter/receiver 416 (comprising the antenna 420), the transmitting processor 415, the receiving processor 412 and the controller/processor 440 in FIG. 4 of the present disclosure; the second transmitter 1403 comprises the transmitter/receiver 416 (comprising the antenna 420) and the transmitting processor 415 in FIG. 4 of the present disclosure.

In Embodiment 14, the first transmitter 1401 transmits first information and second information; the second transceiver 1402 receives a first radio signal; and the second transmitter 1403 transmits a first signaling in a first time window; herein, the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring of the first signaling, and the first bit block comprises a positive integer number of bit(s); the first identity is different from the second identity, the second identity being used to generate a scrambling code for the bit output by the first bit block through channel coding, or the first identity is the same as the second identity; the first information, the second information, the first radio signal and the first signaling are all transmitted via an air interface.

In one embodiment, the second transceiver 1402 also transmits a second radio signal; herein, the first signaling is used to indicate time-frequency resources occupied by and a modulation and coding scheme of the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted via the air interface.

In one embodiment, the second transceiver 1402 also receives a third radio signal; and the second transmitter 1403 also transmits a second signaling in a second time window; herein, a time interval between an end of a transmission of the third radio signal and a start of the second time window is a second time interval, and a time length of the second time interval is related to the time length of the first time interval; a third identity is used for monitoring of the second signaling, and a radio resource occupied by the third radio signal is used to determine the third identity; the third radio signal and the second signaling are transmitted via the air interface.

In one embodiment, the second transceiver 1402 also transmits a fourth radio signal; herein, the second signaling is used to indicate time-frequency resources occupied by and a modulation and coding scheme of the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface.

In one embodiment, the second transceiver 1402 also transmits a fourth radio signal; herein, the second signaling is used to indicate time-frequency resources occupied by and a modulation and coding scheme of the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and the time length of the first time interval; the fourth radio signal is transmitted via the air interface; the third bit block also carries third information, the third information is used to indicate time-frequency resources occupied by and a modulation and coding scheme of the first radio signal, and the third identity is used to generate a scrambling code for a bit output by the third bit block through channel coding.

In one embodiment, the second transmitter 1403 also transmits a third signaling; herein, the third signaling is used to indicate time-frequency resources occupied, a redundancy version (RV) applied and a modulation and coding scheme employed by the first radio signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second-type communication node or base station or network-side equipment in the present disclosure includes but is not limited to macro-cellular base stations, micro-cellular base stations, home base stations, relay base station, eNB, gNB, Transmitter Receiver Point (TRP), relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
   receiving first information and second information;
   transmitting a first radio signal; and
   monitoring a first signaling in a first time window;
   wherein the first information is used to determine a time length of the first time window, a time interval between an end of a transmission of the first radio signal and a start of the first time window is a first time interval, and the second information is used to determine a time length of the first time interval;
   a bit output by a first bit block through channel coding is used to generate the first radio signal, the first bit block carries a first identity, a second identity is used for monitoring the first signaling, and the first bit block comprises a positive integer number of bit(s);
   the first identity is different from the second identity, or the first identity is the same as the second identity, wherein the second identity being used to generate a scrambling code for the bit output by the first bit block through channel coding when the first identity is different from the second identity;
   the first information, the second information, the first radio signal and the first signaling are all transmitted via an air interface;
   the first signaling comprises all or part of fields in downlink control information (DCI), the first signaling is monitored in a common search space;
   the first radio signal is transmitted through physical uplink shared channel (PUSCH), the first radio signal carries an initial transmission or a retransmission of random access message 3 (Msg3);
   the first time window comprises a positive integer number of contiguous subframes.

2. The method according to claim 1, further comprising:
   receiving a second radio signal;
   wherein the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s);
   the second radio signal is transmitted through physical downlink shared channel (PDSCH), the second radio signal is transmitted via the air interface.

3. The method according to claim 1, further comprising:
   transmitting a third radio signal; and
   monitoring a second signaling in a second time window;
   wherein a time interval between an end of a transmission of the third radio signal and a start of the second time window is a second time interval, and a time length of the second time interval is related to a time length of the first time interval, the second information is used to determine both the time length of the second time interval and the time length of the first time interval; a third identity is used for monitoring the second signaling, and a radio resource occupied by the third radio signal is used to determine the third identity; the third radio signal and the second signaling are transmitted via the air interface; the second time window is a Random Access Response (RAR) window, the time length of the second time window is configurable; the third radio signal is transmitted through a Physical Random Access Channel (PRACH), the third radio signal carries a Preamble, the third identity is a Random Access Radio Network Temporary Identity (RA-RNTI).

4. The method according to claim 3, further comprising:
   receiving a fourth radio signal;
   wherein the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval, the first transmission timing adjustment is related to the time length of the first time interval; the first transmission timing adjustment is a Timing Advance (TA) comprised by Random Access Response (RAR), the fourth radio signal is transmitted via the air interface.

5. The method according to claim 1, further comprising:
   receiving a third signaling;
   wherein the third signaling is used to indicate time-frequency resources occupied by the first radio signal, a redundancy version (RV) applied by the first radio signal and a modulation and coding scheme employed by the first radio signal; the third signaling carries all or part of fields of DCI, the third signaling is transmitted through PDCCH, the third signaling is used to schedule a retransmission of Msg3.

6. The method according to claim 1, wherein the first identity is a C-RNTI, the second identity is a C-RNTI, the first identity is same as the second identity, the second identity being used to generate a scrambling code for the bit output by the first bit block through channel coding; or
   the first identity is a contention resolution identity, the second identity is a TC-RNTI, the first identity is different from the second identity.

7. The method according to claim 1, wherein the second information is used to indicate a reference Round Trip Time (RTT) delay between a transmitter of the second information and a receiver of the second information, the time length of the first time interval is positively linear with the reference RTT delay.

8. A first-type communication node for wireless communications, comprising:
   a first receiver, receiving first information and second information;
   a first transceiver, transmitting a first radio signal; and
   a second receiver, monitoring a first signaling in a first time window;
   wherein the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity or the first identity is the same as the second identity, wherein, the second identity being used to generate a scrambling code for the bit output by the first bit block through channel coding when the first identity is different from the second identity; the first information, the second information, the first radio signal and the first signaling are all transmitted via an air interface; the first signaling comprises all or part of fields in DCI, the first signaling is monitored in a common search space; the first radio signal is transmitted through PUSCH, the first radio signal carries an initial transmission or a retransmission of Msg3; the first time window comprises a positive integer number of contiguous subframes.

9. The first-type communication node according to claim 8, wherein the first transceiver receives a second radio signal; wherein the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted through a PDSCH, the second radio signal is transmitted via the air interface.

10. The first-type communication node according to claim 8, wherein the first transceiver transmits a third radio signal; and the second receiver monitors a second signaling in a second time window; wherein a time interval between an end of a transmission of the third radio signal and a start of the second time window is a second time interval, and a time length of the second time interval is related to a time length of the first time interval, the second information is used to determine both the time length of the second time interval and the time length of the first time interval; a third identity is used for monitoring the second signaling, and a radio resource occupied by the third radio signal is used to determine the third identity; the third radio signal and the second signaling are transmitted via the air interface; the second time window is a Random Access Response (RAR) window, the time length of the second time window is configurable; the third radio signal is transmitted through a Physical Random Access Channel (PRACH), the third radio signal carries a Preamble, the third identity is a Random Access Radio Network Temporary Identity (RA-RNTI).

11. The first-type communication node according to claim 10, wherein the first transceiver receives a fourth radio signal; wherein the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval, the first transmission timing adjustment is related to the time length of the first time interval; the first transmission timing adjustment is a Timing Advance (TA) comprised by Random Access Response (RAR), the fourth radio signal is transmitted via the air interface.

12. The first-type communication node according to claim 8, wherein the second receiver receives a third signaling; wherein the third signaling is used to indicate time-frequency resources occupied by the first radio signal, a redundancy version (RV) applied by the first radio signal and a modulation and coding scheme employed by the first radio signal; the third signaling carries all or part of fields of DCI, the third signaling is transmitted through PDCCH, the third signaling is used to schedule a retransmission of Msg3.

13. The first-type communication node according to claim 8, wherein the first identity is a C-RNTI, the second identity is a C-RNTI, the first identity is same as the second identity, the second identity being used to generate a scrambling code for the bit output by the first bit block through channel coding; or the first identity is a contention resolution identity, the second identity is a TC-RNTI, the first identity is different from the second identity.

14. The first-type communication node according to claim 8, wherein the second information is used to indicate a reference Round Trip Time (RTT) delay between a transmitter of the second information and a receiver of the second information, the time length of the first time interval is positively linear with the reference RTT delay.

15. A second-type communication node for wireless communications, comprising:
a first transmitter, transmitting first information and second information;
a second transceiver, receiving a first radio signal; and
a second transmitter, transmitting a first signaling in a first time window;
wherein the first information is used to determine a time length of the first time window, a time interval between an end of a transmission of the first radio signal and a start of the first time window is a first time interval, and the second information is used to determine a time length of the first time interval; a bit output by a first bit block through channel coding is used to generate the first radio signal, the first bit block carries a first identity, a second identity is used for monitoring the first signaling, and the first bit block comprises a positive integer number of bit(s); the first identity is different from the second identity or the first identity is the same as the second identity, wherein, the second identity being used to generate a scrambling code for the bit output by the first bit block through channel coding when the first identity is different from the second identity; the first information, the second information, the first radio signal and the first signaling are all transmitted via an air interface; the first signaling comprises all or part of fields in DCI, the first signaling is monitored in a common search space; the first radio signal is transmitted through PUSCH, the first radio signal carries an initial transmission or a retransmission of Msg3; the first time window comprises a positive integer number of contiguous subframes.

16. The second-type communication node according to claim 15, wherein the second transceiver transmits a second radio signal; wherein the first signaling is used to indicate time-frequency resources occupied by the second radio signal and a modulation and coding scheme employed by the second radio signal, and a bit output by a second bit block through channel coding is used to generate the second radio signal, the second bit block carries the first identity, and the second identity is used to generate a scrambling code for the bit output by the second bit block through channel coding, the second bit block comprising a positive integer number of bit(s); the second radio signal is transmitted through PDSCH, the second radio signal is transmitted via the air interface.

17. The second-type communication node according to claim 15, wherein the second transceiver receives a third radio signal; and the second transmitter transmits a second signaling in a second time window; wherein a time interval between an end of a transmission of the third radio signal and a start of the second time window is a second time interval, and a time length of the second time interval is related to a time length of the first time interval, the second information is used to determine both the time length of the second time interval and the time length of the first time interval; a third identity is used for monitoring the second signaling, and a radio resource occupied by the third radio signal is used to determine the third identity; the third radio signal and the second signaling are transmitted via the air interface; the second time window is a Random Access Response (RAR) window, the time length of the second time window is configurable; the third radio signal is transmitted through a Physical Random Access Channel (PRACH), the third radio signal carries a Preamble, the third identity is a Random Access Radio Network Temporary Identity (RA-RNTI).

18. The second-type communication node according to claim 17, wherein the second transceiver transmits a fourth radio signal; wherein the second signaling is used to indicate time-frequency resources occupied by the fourth radio signal and a modulation and coding scheme employed by the fourth radio signal, a bit output by a third bit block through channel coding is used to generate the fourth radio signal, the third bit block carries the second identity, and the third bit block also carries a first transmission timing adjustment, the third bit block comprising a positive integer number of bit(s); a transmission timing for the first radio signal is related to both the first transmission timing adjustment and a time length of the first time interval, the first transmission timing adjustment is related to the time length of the first time interval; the first transmission timing adjustment is a Timing Advance (TA) comprised by Random Access Response (RAR), the fourth radio signal is transmitted via the air interface.

19. The second-type communication node according to claim 15, wherein the second transmitter transmits a third signaling; wherein the third signaling is used to indicate time-frequency resources occupied by the first radio signal, a redundancy version (RV) applied by the first radio signal and a modulation and coding scheme employed by the first radio signal; the third signaling carries all or part of fields of DCI, the third signaling is transmitted through PDCCH, the third signaling is used to schedule a retransmission of Msg3.

20. The second-type communication node according to claim 15, wherein the second information is used to indicate a reference Round Trip Time (RTT) delay between a transmitter of the second information and a receiver of the second information, the time length of the first time interval is positively linear with the reference RTT delay.

\* \* \* \* \*